(12) United States Patent
Berneth et al.

(10) Patent No.: US 6,767,481 B2
(45) Date of Patent: Jul. 27, 2004

(54) ELECTROCHROMIC SYSTEM WITH COUPLED RED-OX SYSTEM AND SPECIAL ANIONS

(75) Inventors: Horst Berneth, Leverkusen (DE); Serguei Kostromine, Swisttal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 171 days.

(21) Appl. No.: 10/150,335

(22) Filed: May 17, 2002

(65) Prior Publication Data

US 2002/0197486 A1 Dec. 26, 2002

Related U.S. Application Data

(62) Division of application No. 09/485,758, filed as application No. PCT/EP98/04909 on Aug. 6, 1998, now Pat. No. 6,417,951.

(30) Foreign Application Priority Data

Aug. 18, 1997 (DE) .......................................... 197 35 733

(51) Int. Cl.$^7$ ................................................. G02F 1/15
(52) U.S. Cl. ....................... 252/583; 252/586; 359/265; 359/267; 359/272; 359/275
(58) Field of Search ................................ 252/583, 586; 359/265, 267, 270, 272, 275

(56) References Cited

U.S. PATENT DOCUMENTS

| | | | |
|---|---|---|---|
| 3,280,701 A | 10/1966 | Donnelly et al. .............. 88/77 |
| 4,902,108 A | 2/1990 | Byker ......................... 350/357 |
| 5,151,816 A | 9/1992 | Varaprasad et al. ......... 359/275 |
| 6,183,878 B1 * | 2/2001 | Berneth et al. ............. 428/583 |
| 6,372,159 B1 * | 4/2002 | Berneth et al. ............. 252/583 |
| 6,545,793 B2 * | 4/2003 | Berneth et al. ............. 359/265 |
| 2002/0145790 A1 * | 10/2002 | Berneth et al. ............. 359/265 |
| 2003/0103256 A1 * | 6/2003 | Berneth et al. ............. 359/265 |
| 2003/0206326 A1 * | 11/2003 | Berneth et al. ............. 359/265 |

FOREIGN PATENT DOCUMENTS

WO    WO 97/30134    *    8/1997

OTHER PUBLICATIONS

Topics in Current Chemistry, vol. 92, pp. 1–44, Hünig et al, Two Step Reversible Redox Systems of the Weltz Type, date unavailable.

Angewandte Chemie, 90, month unavailable 1978, pp. 927–938, Deuchert et al, Mehrstufige organische Redoxysysteme–ein allgemeines Strukturprinzip.

* cited by examiner

*Primary Examiner*—Philip C. Tucker
(74) *Attorney, Agent, or Firm*—Godfried R. Akorli; Diderico van Eyl

(57) ABSTRACT

This invention relates to electrochromic fluids based on electrochromic systems containing at least one oxidizable substance $RED_1$ and at least one reducible substance $OX_2$ linked covalently by a bridge that are suitable for use in electrochromic devices.

16 Claims, No Drawings

ELECTROCHROMIC SYSTEM WITH COUPLED RED-OX SYSTEM AND SPECIAL ANIONS

RELATED APPLICATIONS

This application is a division of application Ser. No. 09/485,758 filed Feb. 15, 2000 now U.S. Pat. No. 6,417,951 which is a 371 of PCT/EP98/04909 filed Aug. 6, 1998.

The present invention relates to an electrochromic system, to an electrochromic fluid comprising this electrochromic system, and to an electrochromic device comprising this electrochromic fluid.

Electrochromic devices comprising an electrochromic system are already known.

The electrochromic system of such devices customarily includes pairs of redox substances—redox couples—dissolved in an inert solvent. Additionally, conductive salts, light stabilizers and substances which influence the viscosity may be present.

The redox couple used comprises one reducible and one oxidizable substance each. Both are colourless or have only a weak coloration. Under the influence of an electrical voltage the one substance is reduced and the other oxidized, with at least one becoming coloured in the process. After the voltage is switched off, the two original redox substances are formed once more, which is accompanied by the disappearance or fading of the colour.

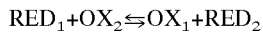

(colourless) (coloured)

(low-energy couple) (high-energy couple)

U.S. Pat. No. 4,902,108 discloses that suitable such redox couples are those in which the reducible substance has at least two chemically reversible reduction waves in the cyclic voltammogram and the oxidizable substance, correspondingly, has at least two chemically reversible oxidation waves.

Electrochromic devices can find multivarious applications. For example, they may take the form of a rearview car mirror which when travelling at night can be darkened by applying a voltage, thus preventing the driver being dazzled by headlights of other vehicles (cf. e.g. U.S. Pat. Nos. 3,280,701, 4,902,108, EP-A-0 435 689). Such devices may also be employed in window panes or car sunroofs where, following application of a voltage, they provide shade from the sunlight. Finally, it is possible to use such devices to construct a display device for the graphic representation of information in the form of letters, numbers and symbols.

Electrochromic devices normally consist of a pair of glass or plastic plates, one being mirrored in the case of a car mirror. One side of these plates is coated with a transparent, electroconductive layer, e.g. indium tin oxide (ITO). These plates are then used to construct a cell: to this end their facing, electroconductively coated side is attached, preferably by means of adhesive bonding, to an annular or rectangular sealing ring. The sealing ring establishes a uniform distance between the plates of, for example, from 0.1 to 0.5 mm. This cell is then filled, via an aperture, with an electrochromic solution and then tightly sealed. By way of the ITO layer it is possible to contact the two plates separately.

The electrochromic systems known from the prior art comprise redox couples which following the reduction and oxidation, respectively, form coloured free radicals, cationic free radicals or anionic free radicals that are chemically reactive. As known, for example, from Topics in Current Chemistry, Vol. 92, pp. 1–44 (1980) such (ionic) free radicals may be sensitive to electrophiles or nucteophiles or else to free radicals. In order, therefore, to achieve a high level of stability in an electrochromic device comprising an electrochromic system of this kind—a system which is intended to withstand several thousand switching cycles—it is necessary to ensure that the solvent used is absolutely free from electrophiles, e.g. protons, nucleophiles and oxygen. It must also be ensured that such reactive species are not formed by electrochemical processes taking place at the electrodes during operation of the electrochromic device.

The back-reaction to $RED_1$ and $OX_2$ that is formulated in the above equation also takes place continuously away from the electrodes within the volume of the solution while the electrochromic device is in operation. Owing to the above-described hazards of degradation reactions of the (ionic) free radicals by electrophiles, nucleophiles or free radicals it is important, for the long-term stability of the display, that the back-reaction in accordance with the above equation is able to take place as rapidly as possible and without side reactions A frequent observation in such electrochromic devices is a separation, known as segregation, of the coloured species $OX_1$ and $RED_2$, leading to the development in the device of coloured spots or stripes Segregation of this kind is observed, for example, when the device is not positioned horizontally. Current flow over a prolonged period may also lead to such segregation. Since many of the abovementioned uses of such electrochromic devices, for example in the case of car rearview mirrors, window panes or display devices, operate with the device preferably in a perpendicular or near-perpendicular position and in some cases over prolonged periods of time as well, such segregation leads to serious problems.

It has now been found that by coupling $RED_1$ and $OX_2$ via a covalent chemical bond, and through the presence of specific anions in the electrochromic solution, it is possible to suppress to a large extent or completely eliminate such segregation.

The present invention accordingly relates to an electrochromic system comprising at least one oxidizable substance $RED_1$ which releases electrons at an anode, and at least one reducible substance $OX_2$ which accepts electrons at a cathode and in so doing undergo transition from a weakly coloured or colourless form into a coloured form $OX_1$ and $RED_2$, respectively, accompanied by an increase in the absorbance in the visible region of the spectrum, the weakly coloured or colourless form being restored after charge equalization, characterized in that at least one of the substances $RED_1$ and $OX_2$ that are present are linked covalently to one another via a bridge and in that at least one anion type $X^-$ is present which a) has a molar mass>200 g/mol, preferably>250 g/mol and/or b) has a cagelike structure.

Cagelike structure means closed cages as well as such structures derived from closed cages by removing 1 to 3 atoms of the cagelike structure (nestlike structure).

At least one of the transitions induced by oxidation or reduction, $RED_1 \leftrightarrows OX_1$ or $OX_2 \leftrightarrows RED_2$, respectively, is associated with an increase in absorbance in the visible region of the spectrum.

The reduction and oxidation processes in the electrochromic system of the invention generally take place by electrons being accepted or released at a cathode or anode, respectively, a potential difference of from 0.3 to 3 V preferably obtaining between the electrodes. After the electrical potential has been switched off, charge equalization takes place—in general spontaneously—between the substances RED$_2$ and OX$_1$, accompanied by disappearance or fading of the colour. Such charge equalization also takes place even while the current is flowing in the interior of the electrolyte volume.

The electrochromic system of the invention preferably comprises at least one electrochromic substance of the formula (I)

  (I)

in which

Y and Z independently of one another represent a radical OX$_2$ or RED$_1$, subject to the proviso that at least one Y represents OX$_2$ and at least one Z represents RED$_1$, where OX$_2$ represents the radical of a reversibly electrochemically reducible redox system, and RED$_1$ represents the radical of a reversibly electrochemically oxidizable redox system, B represents a bridge member c represents an integer from 0 to 5, and a and b independently of one another represent an integer from 0 to 5, preferably an integer from 0 to 3.

The electrochromic system preferably comprises at least one electrochromic substance of the formula (I) in which Y represents OX$_2$ and Z represents RED$_1$ and Y and Z alternate in their sequence.

With particular preference, the electrochromic system of the invention comprises at least one electrochromic substance of the formula OX$_2$-B-RED$_1$ (Ia), OX$_2$-B-RED$_1$-B-OX$_2$ (Ib), RED$_1$-B-OX$_2$-B-RED$_1$ (Ic), or OX$_2$-(B-RED$_1$-B-OX$_2$)$_d$-B-RED$_1$ (Id), in which OX$_2$, RED$_1$ and B have the meaning indicated above and d represents an integer from 1 to 5.

The electrochromic system of the invention preferably comprises at least one anion type X$^-$ which a) has a molar mass>200 g/mol, preferably>250 g/mol and/or b) has a cagelike structure, where X$^-$ is the counterion of OX$_2$ and/or is a constituent of an inert conductive salt.

Anions with cagelike structure means especially such anions, which are derived from carbaboranes, with very particular preference dicarba-nido-undecarborates and dicarba-closo-dodecarbonates.

Where OX$_2$ has no positive charge the anion type X$^-$ that is present in accordance with the invention is a constituent of an inert conductive salt.

The anion type X$^-$ present in the electrochromic system of the invention may suitably be, in particular:

C$_{10}$- to C$_{25}$-alkanesulphonate, preferably C$_{13}$- to C$_{25}$-alkanesulphonate, C$_3$- to C$_{18}$-perfluoroalkanesulphonate, preferably C$_5$- to C$_{18}$-perfluoroalkanesulphonate, C$_{13}$- to C$_{25}$-alkanoate, benzenesulphonate substituted by nitro, C$_4$- to C$_{25}$-alkyl, perfluoro-C$_1$- to C$_8$-alkyl, C$_1$- to C$_{12}$-alkoxycarbonyl or dichloro, naphthalene- or biphenylsulphonate each of which is unsubstituted or substituted by nitro, cyano, hydroxyl, C$_1$- to C$_{25}$-alkyl, C$_1$- to C$_{12}$-alkoxy, amino, C$_1$- to C$_{12}$-alkoxycarbonyl or chloro, benzene-, naphthalene- or biphenyldisulphonate each of which is unsubstituted or substituted by nitro, cyano, hydroxyl, C$_1$- to C$_{25}$-alkyl, C$_1$- to C$_{12}$-alkoxy, C$_1$- to C$_{12}$-alkoxycarbonyl or chloro, benzoate substituted by dinitro, C$_6$- to C$_{25}$-alkyl, C$_4$- to C$_{12}$-alkoxycarbonyl, benzoyl, chlorobenzoyl or toluoyl, or the anion of naphthalenedicarboxylic acid, diphenyl ether disulphonate, tetraphenylborate, cyanotriphenylborate, tetra-C$_3$- to C$_{20}$-alkoxyborate, tetraphenoxyborate, 7,8- or 7,9-dicarba-nido-undecaborate(1-) or (2-), each of which is unsubstituted or substituted on the B and/or C atoms by one or two C$_1$- to C$_{12}$-alkyl or phenyl groups, dodecahydrodicarbadodecaborate(2-) or B-C$_1$- to C$_{12}$-alkyl-C-phenyl-dodecahydrodicarbadodecaborate(1-).

With very particular preference, the electrochromic system of the invention comprises at least one electrochromic substance of the formulae (Ia)–(Id) in which OX$_2$ represents the radical of a cathodically reducible substance which in its cyclic voltammogram, recorded in an inert solvent at room temperature, exhibits at least two chemically reversible reduction waves, the first of these reduction waves leading to an increase in the absorbance at at least one wavelength in the visible region of the electromagnetic spectrum, RED$_1$ represents the radical of an anodically reversibly oxidizable substance which in its cyclic voltammogram, recorded in an inert solvent at room temperature, exhibits at least two chemically reversible oxidation waves, the first of these oxidation waves leading to an increase in the absorbance at at least one wavelength in the visible region of the electromagnetic spectrum, and B represents a bridge.

Particular preference is given to an electrochromic system of the invention which comprises at least one substance of the formula (Ia)–(Id) in which OX$_2$ represents a radical of the formula

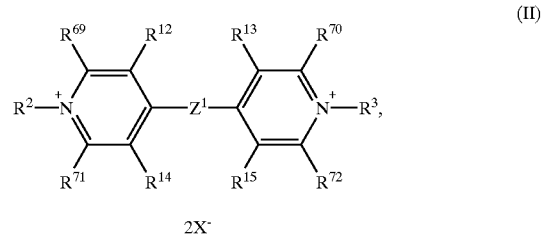

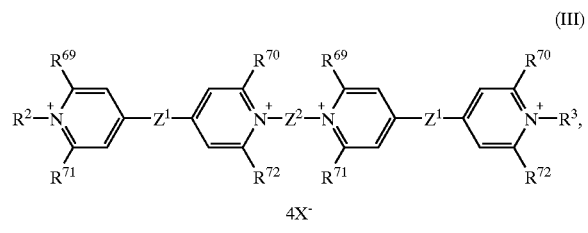

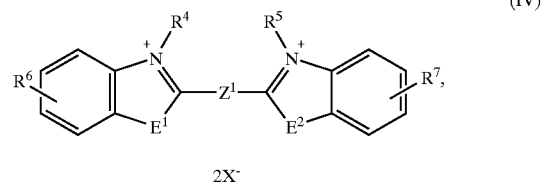

-continued

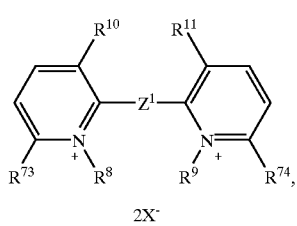
(V)

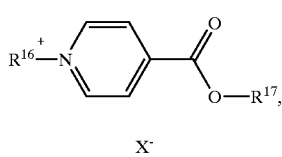
(VI)

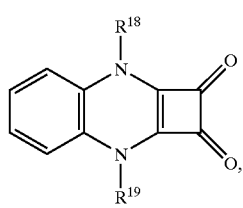
(VII)

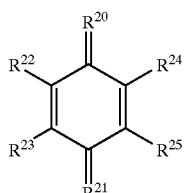
(VIII)

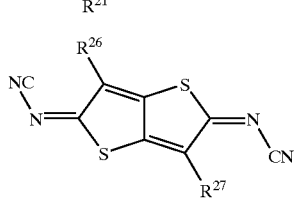
(IX)

where
R$^2$ to R$^5$, R$^8$, R$^9$, R$^{16}$ to R$^{19}$ independently of one another denote C$_1$- to C$_{18}$-alkyl, C$_2$- to C$_{12}$-alkenyl, C$_3$- to C$_7$-cycloalkyl, C$_7$- to C$_{15}$-aralkyl or C$_6$- to C$_{10}$-aryl, or R$^4$ and R$^5$ or R$^8$ and R$^9$ together form a —(CH$_2$)$_2$— or —(CH$_2$)$_3$— bridge, R$^6$, R$^7$ and R$^{22}$ to R$^{25}$ independently of one another denote hydrogen, C$_1$- to C$_4$-alkyl, C$_1$- to C$_4$-alkoxy, halogen, cyano, nitro or C$_1$- to C$_4$-alkoxycarbonyl, or R$^{22}$ and R$^{23}$ and/or R$^{24}$ and R$^{25}$ form a —CH=CH—CH=CH— bridge, R$^{10}$ and R$^{11}$, R$^{12}$ and R$^{13}$, R$^{14}$ and R$^{15}$ independently of one another denote hydrogen or in pairs denote a —(CH$_2$)$_2$—, —(CH$_2$)$_3$— or —CH=CH— bridge, R$^{20}$ and R$^{21}$ independently of one another denote O, N—CN, C(CN)$_2$ or N—C$_6$- to C$_{10}$-aryl, R$^{26}$ denotes hydrogen, C$_1$- to C$_4$-alkyl, C$_1$- to C$_4$-alkoxy, halogen, cyano, nitro or C$_1$- to C$_4$-alkoxycarbonyl or C$_6$- to C$_{10}$-aryl, R$^{69}$ to R$^{74}$ independently of one another denote hydrogen or C$_1$–C$_6$-alkyl, or R$^{69}$; R$^{12}$ and/or R$^{70}$; R$^{13}$ form a —CH=CH—CH=CH— bridge, E$^1$ and E$^2$ independently of one another denote O, S, NR$^1$ or C(CH$_3$)$_2$, or E$^1$ and E$^2$ together form an —N—(CH$_2$)$_2$—N— bridge, R$^1$ denotes C$_1$- to C$_{18}$-alkyl, C$_2$- to C$_{12}$-alkenyl, C$_4$- to C$_7$-cycloalkyl, C$_7$- to C$_{15}$-aralkyl, C$_6$- to C$_{10}$-aryl, Z$^1$ denotes a direct bond, —CH=CH—, —C(CH$_3$)=CH—, —C(CN)=CH—, —CCl=CCl—, —C(OH)=CH—, —CCl=CH—, —C≡C—, —CH=N—N=CH—, —C(CH$_3$)=N—N=C(CH$_3$)— or —CCl=N—N=CCl—, Z$^2$ denotes —(CH$_2$)$_r$— or —CH$_2$—C$_6$H$_4$—CH$_2$—, r denotes an integer from 1 to 10, X$^-$ represents an anion which is redox-inert under the conditions and which a) has a molar mass>200 g/mol, preferably>250 g/mol and/or b) has a cagelike structure, where the bond to the bridge B is via one of the radicals R$^2$–R$^{19}$, R$^{22}$–R$^{27}$ or, if E$^1$ or E$^2$ represents NR$^1$, is via R$^1$, and the radicals mentioned in that case represent a direct bond, RED$_1$ represents one of the following radicals

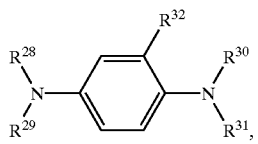
(X)

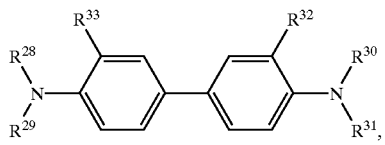
(XI)

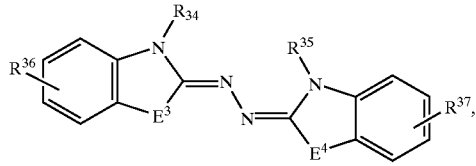
(XII)

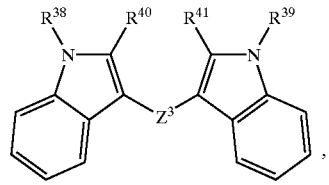
(XIII)

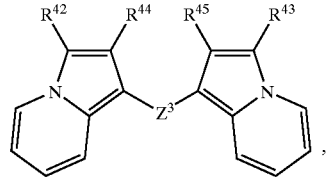
(XIV)

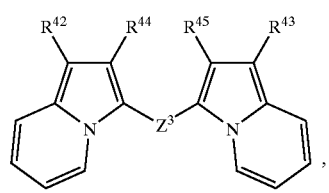
(XV)

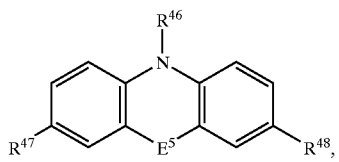
(XVI)

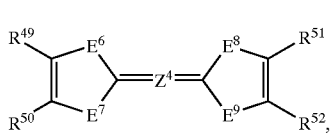
(XVII)

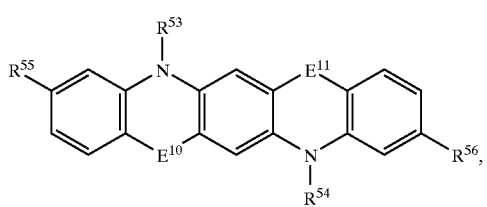
(XVIII)

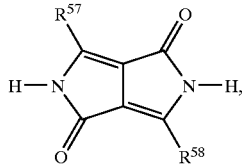
(XIX)

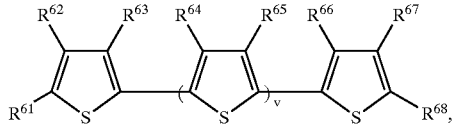
(XX)

in which
- $R^{28}$ to $R^{31}$, $R^{34}$, $R^{35}$, $R^{38}$, $R^{39}$, $R^{46}$, $R^{53}$ and $R^{54}$ independently of one another denote $C_1$- to $C_{18}$-alkyl, $C_2$- to $C_{12}$-alkenyl, $C_3$- to $C_7$-cycloalkyl, $C_7$- to $C_{15}$-aralkyl or $C_6$- to $C_{10}$-aryl, and $R^{46}$, $R^{53}$ and $R^{54}$ additionally denote hydrogen,
- $R^{32}$, $R^{33}$, $R^{36}$, $R^{37}$, $R^{40}$, $R^{41}$, $R^{42}$ to $R^{45}$, $R^{47}$, $R^{48}$, $R^{49}$ to $R^{52}$ and $R^{55}$ to $R^{57}$ independently of one another denote hydrogen, $C_1$- to $C_4$-alkyl, $C_1$- to $C_4$-alkoxy, halogen, cyano, nitro, $C_1$- to $C_4$-alkoxycarbonyl or $C_6$- to $C_{10}$-aryl and $R^{57}$ and $R^{58}$ additionally denote an optionally benzo-fused aromatic or quasi-aromatic five- or six-membered heterocyclic ring and $R^{48}$ additionally denotes $NR^{75}R^{76}$,
- $R^{49}$ and $R^{50}$ and/or $R^{51}$ and $R^{52}$ form a —(CH$_2$)$_3$—, —(CH$_2$)$_4$—, —(CH$_2$)$_5$— or —CH=CH—CH=CH— bridge,
- $Z^3$ denotes a direct bond, a —CH=CH— or —N=N— bridge,
- =$Z^4$= denotes a direct double bond, a =CH—CH= or =N—N= bridge,
- $E^3$ to $E^5$, $E^{10}$ and $E^{11}$ independently of one another denote O, S, $NR^{59}$ or $C(CH_3)_2$, and $E^5$ additionally denotes C=O or SO$_2$, or
- $E^3$ and $E^4$ independently of one another denote —CH=CH—,
- $E^6$ to $E^9$ independently of one another denote S, Se or $NR^{59}$,
- $R^{59}$, $R^{75}$ and $R^{76}$ independently of one another denote $C_1$- to $C_{12}$-alkyl, $C_2$- to $C_8$-alkenyl, $C_3$- to $C_7$-cycloalkyl, $C_7$- to $C_{15}$-aralkyl or $C_6$- to $C_{10}$-aryl, and $R^{75}$ additionally denotes hydrogen, or
- $R^{75}$ and $R^{76}$ in the definition of $NR^{75}R^{76}$ form, together with the N atom to which they are attached, a five- or six-membered, saturated ring which can contain further heteroatoms,
- $R^{61}$ to $R^{68}$ independently of one another denote hydrogen, $C_1$- to $C_6$-alkyl, $C_1$- to $C_4$-alkoxy, cyano, $C_1$- to $C_4$-alkoxycarbonyl or $C_6$- to $C_{10}$-aryl, or
- $R^{61}$; $R^{62}$ and $R^{67}$; $R^{68}$ independently of one another, together form a —(CH$_2$)$_3$—, —(CH$_2$)$_4$— or —CH=CH—CH=CH— bridge,
- v denotes an integer between 0 and 10,
the bond to the bridge B being via one of the radicals $R^{28}$–$R^{58}$, $R^{61}$, $R^{62}$, $R^{67}$, $R^{68}$ or, if one of the radicals $E^3$–$E^{11}$ represents $NR^{59}$, is via $R^{59}$ and the abovementioned radicals in that case represent a direct bond, and
- B represents a bridge of the formula —(CH$_2$)$_n$— or —[Y$^1{}_s$(CH$_2$)$_m$—Y$^2$]$_o$—(CH$_2$)$_p$—Y$^3{}_q$—, each of which is unsubstituted or substituted by $C_1$- to $C_4$-alkoxy, halogen or phenyl,
- $Y^1$ to $Y^3$ independently of one another represent O, S, $NR^{60}$, COO, CONH, NHCONH, cyclopentanediyl, cyclohexanediyl, phenylene or naphthylene,
- $R^{60}$ denotes $C_1$- to $C_6$-alkyl, $C_2$- to $C_6$-alkenyl, $C_4$- to $C_7$-cycloalkyl, $C_7$- to $C_{15}$-aralkyl or $C_6$- to $C_{10}$-aryl,
- n denotes an integer from 1 to 12,
- m and p independently of one another denote an integer from 0 to 8,
- o denotes an integer from 0 to 6, and
- q and s independently of one another denote 0 or 1, and, if OX$_2$ has no positive charge, there is at least one conductive salt present which comprises the abovementioned anion X$^-$.

Very particular preference is given to an electrochromic system of the invention which comprises at least one substance of the formula (Ia)–(Id)
in which
- OX$_2$ represents a radical of the formula (II), (III), (IV) or (V)

where
- $R^2$, $R^3$, $R^4$, $R^5$, $R^8$ and $R^9$ independently of one another represent $C_1$- to $C_{12}$-alkyl, $C_2$- to $C_8$-alkenyl, $C_5$- to $C_7$-cycloalkyl, $C_7$- to $C_{15}$-aralkyl or $C_6$- to $C_{10}$-aryl,
- $R^6$ and $R^7$ independently of one another represent hydrogen, methyl, ethyl, methoxy, fluoro, chloro, bromo, cyano, nitro, methoxycarbonyl or ethoxycarbonyl,
- $R^{10}$, $R^{11}$; $R^{12}$, $R^{13}$ and $R^{14}$, $R^{15}$ independently of one another represent hydrogen or, if $Z^1$ denotes a direct bond, in each case together represent a —(CH$_2$)$_2$—, —(CH$_2$)$_3$— or —CH=CH— bridge, or
- $R^4$, $R^5$ and $R^8$, $R^9$ independently of one another in pairs together represent a —(CH$_2$)$_2$— or —(CH$_2$)$_3$— bridge if $Z^1$ denotes a direct bond,
- $R^{69}$ to $R^{74}$ independently of one another denote hydrogen or $C_1$-$C_4$-alkyl,
- $E^1$ and $E^2$ are identical and represent O, S, $NR^1$ or $C(CH_3)_2$ or together form an —N—(CH$_2$)$_2$—N— bridge,
- $R^1$ represents $C_1$- to $C_{12}$-alkyl, $C_2$- to $C_4$-alkenyl, $C_5$- to $C_7$-cycloalkyl, $C_7$- to $C_{15}$-aralkyl or $C_6$- to $C_{10}$-aryl,
- $Z^1$ represents a direct bond, —CH=CH—, —C(CH$_3$)=CH—, —C(CN)=CH—, —C≡C— or —CH=N—N=CH—, $Z^2$ represents —(CH)$_r$— or —CH$_2$—C$_6$H$_4$—CH$_2$—, r represents an integer between 1 and 6, X$^-$ represents C$_{10}$- to C$_{25}$-alkanesulphonate, preferably C$_{13}$- to C$_{25}$-alkane-sulphonate, C$_3$- to C$_{18}$-perfluoroalkanesulphonate, preferably C$_5$- to C$_{18}$-perfluoroalkanesulphonate, C$_{13}$- to C$_{25}$-alkanoate, benzenesulphonate substituted by nitro, C$_4$- to C$_{25}$-alkyl, perfluoro-C$_1$- to C$_8$-alkyl, C$_1$- to C$_{12}$-alkoxycarbonyl or dichloro, naphthalene- or biphenylsulphonate each of which is unsubstituted or substituted by nitro, cyano, hydroxyl, C$_1$- to C$_{25}$-alkyl, C$_1$- to C$_{12}$-alkoxy, amino, C$_1$- to C$_{12}$-alkoxycarbonyl or chloro, benzene-, naphthalene- or biphenyldisulphonate each of which is unsubstituted or substituted by nitro, cyano, hydroxyl, C$_1$- to C$_{25}$-alkyl, C$_1$- to C$_{12}$-alkoxy, C$_1$- to C$_{12}$-alkoxycarbonyl or chloro, benzoate substituted by dinitro, C$_6$- to C$_{25}$-alkyl, C$_4$- to C$_{12}$-alkoxycarbonyl, benzoyl, chlorobenzoyl or toluoyl, or the anion of naphthalenedicarboxylic acid, diphenyl ether disulphonate, tetraphenylborate, cyanotriphenylborate, tetra-C$_3$- to C$_{20}$-alkoxyborate, tetraphenoxyborate, 7,8- or 7,9-dicarba-nido-undecaborate(1-) or (2-), each of which is unsubstituted or substituted on the B and/or C atoms by one or two C$_1$- to C$_{12}$-alkyl or phenyl groups, dodecahydrodicarbadodecaborate(2-) or B—C$_1$- to C$_{12}$-alkyl-C-phenyl-dodecahydrodicarbadodecaborate(1-), where in the case of polyvalent anions such as naphthalenedisulphonate X$^-$ represents one equivalent of this anion, where the bond to the bridge B is via one of the radicals R$^2$–R$^{11}$ or, if E$^1$ or E$^2$ represents NR$^1$, is via R$^1$, and the abovementioned radicals in that case represent a direct bond, RED$_1$ represents a radical of the formula (X), (XI), (XII), (XIII), (XVI), (XVII), (XVIII) or (XX), where R$^{28}$ to R$^{31}$, R$^{34}$, R$^{35}$, R$^{38}$, R$^{39}$, R$^{46}$, R$^{53}$ and R$^{54}$ independently of one another denote C$_1$- to C$_{12}$-alkyl, C$_2$- to C$_8$-alkenyl, C$_5$- to C$_7$-cycloalkyl, C$_7$- to C$_{15}$-aralkyl or C$_6$- to C$_{10}$-aryl and R$^{46}$, R$^{53}$ and R$^{54}$ additionally denote hydrogen, R$^{32}$, R$^{33}$, R$^{36}$, R$^{37}$, R$^{40}$, R$^{41}$, R$^{47}$ to R$^{52}$, R$^{55}$ and R$^{56}$ independently of one another denote hydrogen, methyl, ethyl, methoxy, ethoxy, fluoro, chloro, bromo, cyano, nitro, methoxycarbonyl, ethoxycarbonyl or phenyl, and R$^{57}$ and R$^{58}$ additionally denote 2- or 4-pyridyl, and R$^{48}$ additionally denotes NR$^{75}$R$^{76}$, Z$^3$ denotes a direct bond, a —CH=CH— or —N=N— bridge, =Z$^4$= denotes a direct double bond, a =CH—CH= or =N—N= bridge, E$^3$ to E$^5$, E$^{10}$ and E$^{11}$, independently of one another denote O, S, NR$^{59}$ or C(CH$_3$)$_2$, but E$^3$ and E$^4$ have the same meaning, E$^6$ to E$^9$ are identical to one another and denote S, Se or NR$^{59}$, and E$^5$ additionally denotes C=O, E$^6$ represents NR$^{59}$, where R$^{59}$ denotes a direct bond to the bridge B, and E$^7$ to E$^9$ possess the meaning indicated above, but need not be identical to one another, R$^{59}$, R$^{75}$ and R$^{76}$ independently of one another denote C$_1$- to C$_{12}$-alkyl, C$_2$- to C$_8$-alkenyl, C$_5$- to C$_7$-cycloalkyl, C$_7$- to C$_{15}$-aralkyl or C$_6$- to C$_{10}$-aryl, and R$^{75}$ additionally denotes hydrogen, or R$^{75}$ and R$^{76}$ in the definition NR$^{75}$R$^{76}$ denote, together with the N atom to which they are attached, pyrrolidino, piperidino or morpholino, R$^{61}$, R$^{62}$ and R$^{67}$, R$^{68}$ independently of one another represent hydrogen, C$_1$- to C$_4$-alkyl, methoxycarbonyl, ethoxycarbonyl or phenyl, or in pairs together represent a —(CH$_2$)$_3$— or —(CH$_2$)$_4$— bridge, R$^{63}$ to R$^{66}$ represent hydrogen, and v represents an integer from 1 to 6, where the bond to the bridge B is via one of the radicals R$^{28}$–R$^{41}$, R$^{46}$–R$^{56}$, R$^{61}$, R$^{62}$, R$^{67}$, R$^{68}$ or, if one of the radicals E$^3$–E$^{11}$ represents NR$^{59}$, is via R$^{59}$, and the abovementioned radicals in that case represent a direct bond, B represents a bridge of the formulae —(CH$_2$)$_n$—, —(CH$_2$)$_m$—O—(CH$_2$)$_p$—, —(CH)$_m$—NR$^{60}$—(CH$_2$)$_p$—, —(CH$_2$)$_m$—C$_6$H$_4$—(CH$_2$)$_p$—, —[O—(CH$_2$)$_p$]$_o$—O—, —[NR$^{60}$—(CH$_2$)$_p$]$_o$—NR$^{60}$—, —[C$_6$H$_4$—(CH$_2$)$_p$]$_o$—C$_6$H$_4$—, —(CH$_2$)$_m$—OCO—C$_6$H$_4$—COO—(CH$_2$)$_p$—, —(CH$_2$)$_m$—NHCO—C$_6$H$_4$—CONH—(CH$_2$)$_p$—, —(CH$_2$)$_m$—NHCONH—C$_6$H$_4$NHCONH—(CH$_2$)$_p$—, —(CH$_2$)$_m$—OCO—(CH$_2$)$_t$—COO—(CH$_2$)$_p$—, —(CH$_2$)$_m$—NHCO—(CH$_2$)$_t$—CONH—(CH)$_p$—, —(CH$_2$)$_m$—NHCONH—(CH$_2$)$_t$—NHCONH—(CH$_2$)$_p$—, R$^{60}$ represents methyl, ethyl, benzyl or phenyl, n represents an integer from 1 to 10, m and p independently of one another represent an integer from 0 to 4, o represents an integer from 0 to 2, and t represents an integer from 1 to 6.

Especial preference is given to an electrochromic system of the invention which comprises at least one substance of the formula (Ia)–(Id)
in which OX$_2$ represents a radical of the formula (II), (IV) or (V)
in which R$^2$, R$^4$ and R$^8$ represent a direct bond to the bridge B, R$^3$, R$^5$ and R$^9$ independently of one another represent methyl, ethyl, propyl, butyl, pentyl, hexyl, heptyl, octyl, benzyl or phenyl, or in the case of the formula Ic or Id likewise represent a direct bond to the bridge B, R$^6$ and R$^7$ are identical and represent hydrogen, methyl, methoxy, chloro, cyano or methoxycarbonyl, R$^{10}$, R$^{11}$; R$^{12}$, R$^{13}$ and R$^{14}$, R$^{15}$ independently of one another represent hydrogen or, if Z$^1$ denotes a direct bond, represent, in each case in pairs together, a —CH=CH— bridge, R$^{69}$ to R$^{72}$ are identical and denote hydrogen, methyl or ethyl, R$^{73}$ and R$^{74}$ denote hydrogen, E$^1$ and E$^2$ are identical and represent O or S, Z$^1$ represents a direct bond or —CH=CH—, X$^-$ represents C$_{15}$- to C$_{22}$-alkanesulphonate, C$_5$- to C$_{12}$-perfluoroalkanesulphonate, nitrobenzenesulphonate, dinitrobenzenesulphonate, mono- or bis-C$_4$- to C$_{12}$- alkylbenzenesulphonate, dichlorobenzenesulphonate, naphthalenesulphonate, nitronaphthalenesulphonate, dinitronaphthalenesulphonate, mono- or bis-$C_3$- to $C_{12}$-alkylnaphthalenesulphonate, hydroxynapththalenesulphonate, aminonaphthalenesulphonate, biphenyl-sulphonate, benzenedisulphonate, nitrobenzenedisulphonate, $C_4$- to $C_{12}$- alkylbenzenedisulphonate, naphthalenedisulphonate, nitronaphthalenedisulphonate, $C_4$- to $C_{12}$-alkylnaphthalenedisulphonate, biphenyldisulphonate, dinitrobenzoate, mono- or bis-$C_8$- to $C_{12}$-alkylbenzoate, $C_6$- to $C_{12}$-alkoxycarbonylbenzoate, benzylbenzoate, toluoylbenzoate, the anion of naphthalenedicarboxylic acid, cyanotriphenylborate, tetra-$C_3$- to $C_{12}$-alkoxyborate, tetraphenoxyborate, 7,8- or 7,9-dicarba-nido-undecaborate(1-) or (2-) each of which is unsubstituted or substituted on the B and/or C atoms by one or two methyl, ethyl, butyl or phenyl groups, dodecahydrodicarbadodecaborate(2-) or B-methyl-C-phenyl-dodecahydro-dicarbadodecaborate(1-), where in the case of polyvalent anions such as naphthalenedisulphonate $X^-$ represents one equivalent of this anion, $RED_1$ represents a radical of the formula (X), (XII), (XIII), (XVI) or (XVII), $R^{28}$, $R^{34}$, $R^{38}$, $R^{46}$ and $R^{49}$ represent a direct bond to the bridge B, $R^{29}$ to $R^{31}$, $R^{35}$ and $R^{39}$ independently of one another represent methyl, ethyl, propyl, butyl, pentyl, hexyl, heptyl, octyl, benzyl or phenyl, or, in the case of the formula Ib or Id, $R^{30}$, $R^{35}$ and $R^{39}$ likewise represent the direct bond to the bridge B, $R^{32}$, $R^{47}$ and $R^{48}$ represent hydrogen, $R^{36}$, $R^{37}$, $R^{40}$, $R^{41}$ and $R^{50}$ to $R^{52}$ independently of one another represent hydrogen, methyl, methoxy, chloro, cyano, methoxycarbonyl or phenyl, or, in the case of the formula Ib or Id, $R^{51}$ likewise represents a direct bond to the bridge B, $Z^3$ represents a direct bond, a —CH=CH— or —N=N— bridge, =$Z^4$= represents a direct double bond, a =CH—CH= or =N—N= bridge, $E^3$ to $E^5$ independently of one another represent O, S or $NR^{59}$, but $E^3$ and $E^4$ have the same meaning, $E^6$ to $E^9$ are identical to one another and represent S, Se or $NR^{59}$, $R^{59}$ represents methyl, ethyl, propyl, butyl, pentyl, hexyl, heptyl, octyl, benzyl or phenyl, or, in the case of the formula XVI in Ib or Id, likewise represents a direct bond to the bridge B, B represents a bridge of the formulae —$(CH_2)_n$—, —$(CH_2)_m$—O—$(CH_2)_p$—, —$(CH_2)_m$—$NR^{60}$—$(CH_2)_p$—, —$(CH_2)_m$—$C_6H_4$—$(CH_2)_p$—O—$(CH_2)_p$—O—, —$NR^{60}$—$(CH_2)_p$—$NR^{60}$—, —$(CH_2)_m$—OCO—$C_6H_4$—COO—$(CH_2)_p$—, —$(CH_2)_m$—NHCO—$C_6H_4$—CONH—$(CH_2)_p$—, —$(CH_2)_m$—NHCONH—$C_6H_4$—NHCONH—$(CH_2)_p$—, —$(CH_2)_m$—OCO—$(CH_2)_t$—COO—$(CH_2)_p$—, —$(CH_2)_m$—NHCO—$(CH_2)_t$—CONH—$(CH_2)_p$—, —$(CH_2)_m$—NHCONH—$(CH_2)_t$—NHCONH—$(CH_2)_p$—, $R^{60}$ represents methyl, n represents an integer from 1 to 10, m and p are identical and represent an integer from 0 to 2, and t represents an integer from 1 to 6.

Very particular preference is given to an electrochromic system of the invention which comprises at least one substance of the formula (Ia) corresponding to one of the formulae

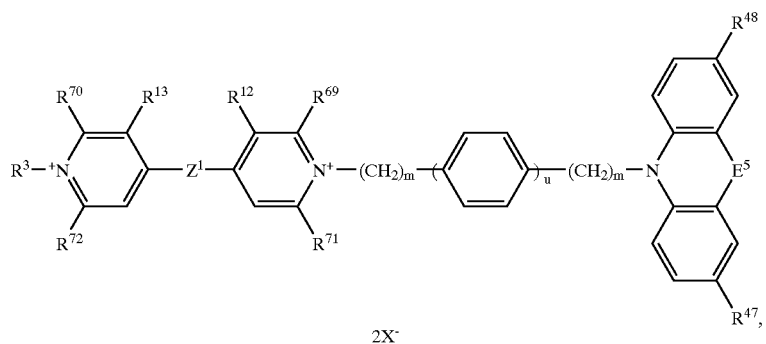

(XXI)

$2X^-$

-continued
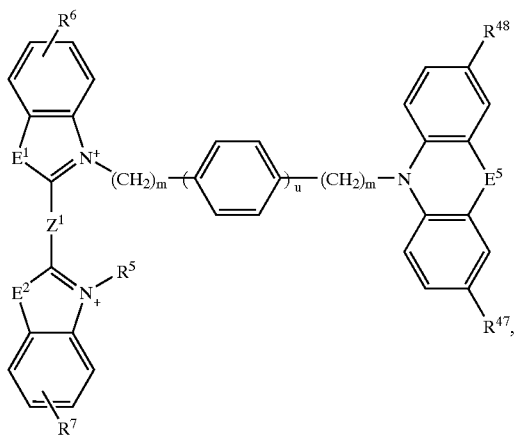
(XXII)
2X⁻
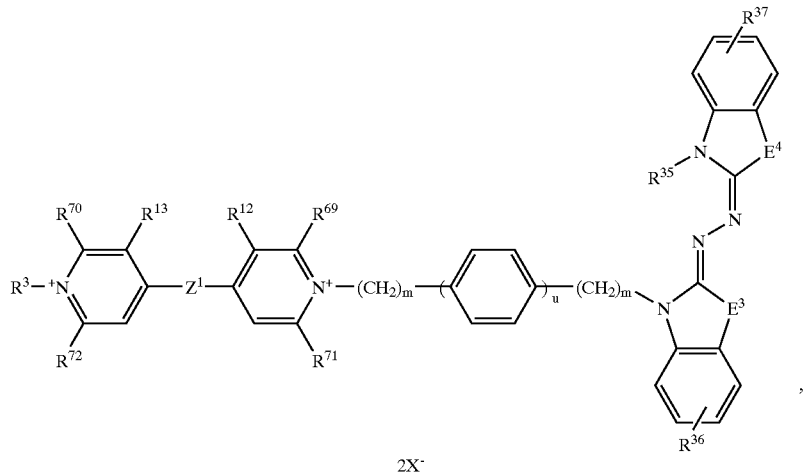
(XXIII)
2X⁻
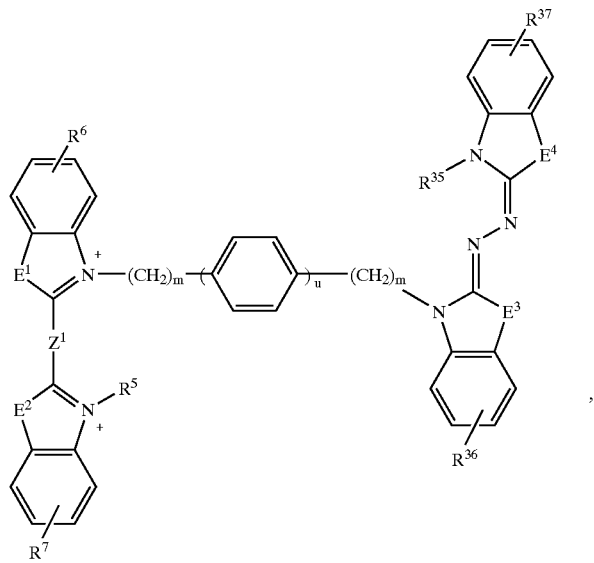
(XXIV)
2X⁻

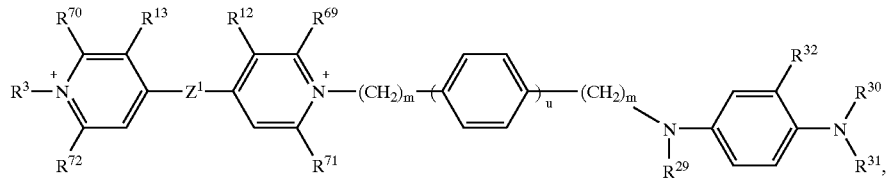
(XXV)
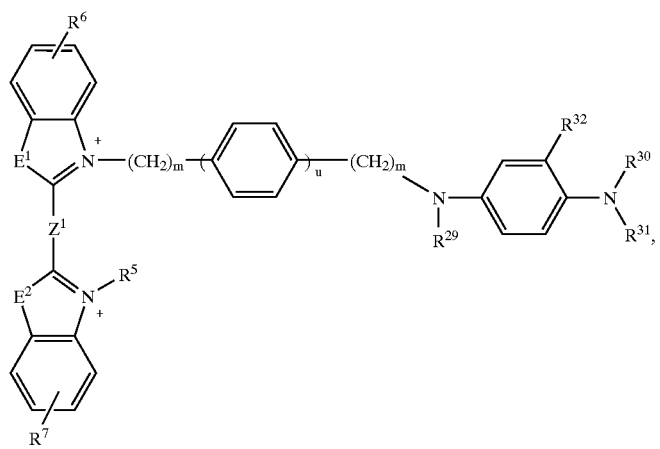
(XXVI)
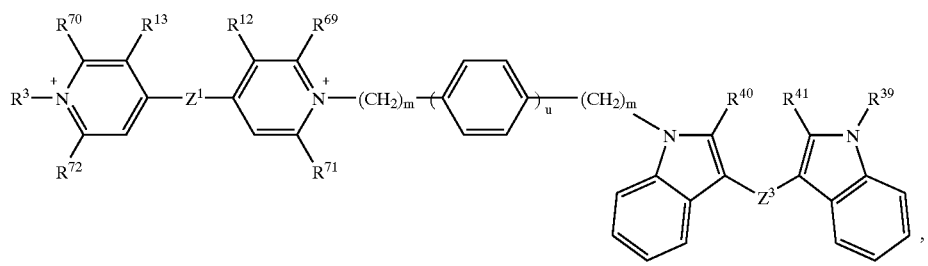
(XXVII)
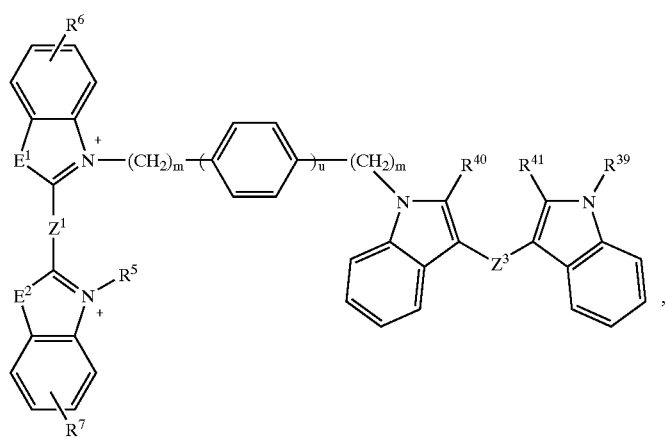
(XXVIII)

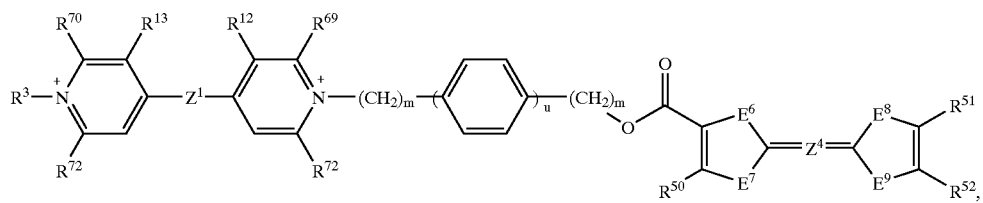
(XXIX)
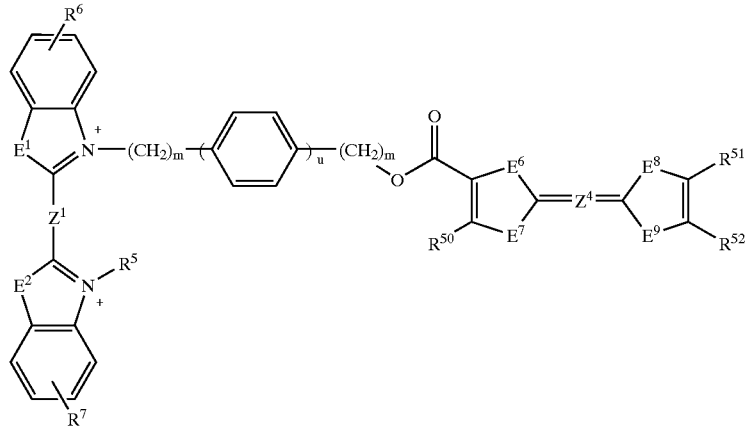
(XXX)
or at least one substance of the formula (Ib) corresponding to one of the formulae
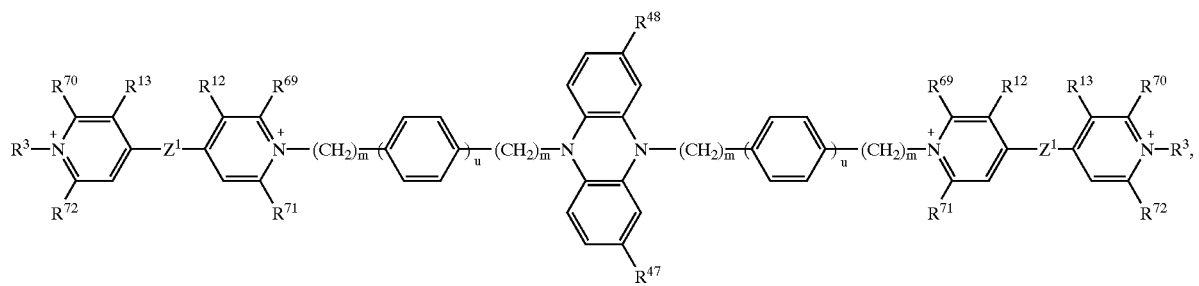
(XXXI)

(XXXII)
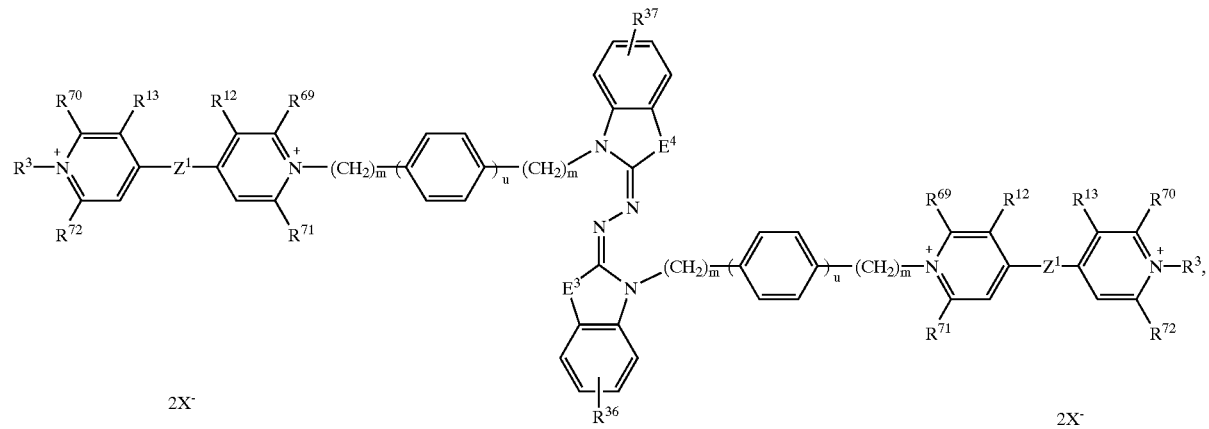
2X⁻
(XXXIII)
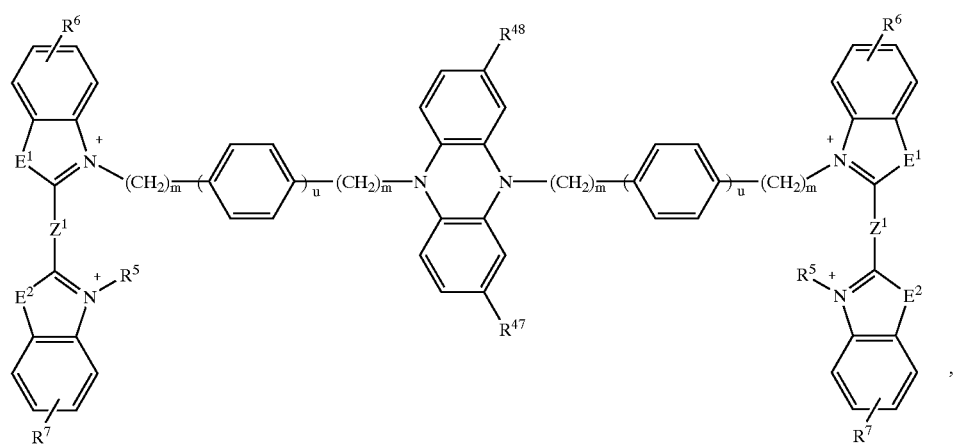
2X⁻  2X⁻
(XXXIV)
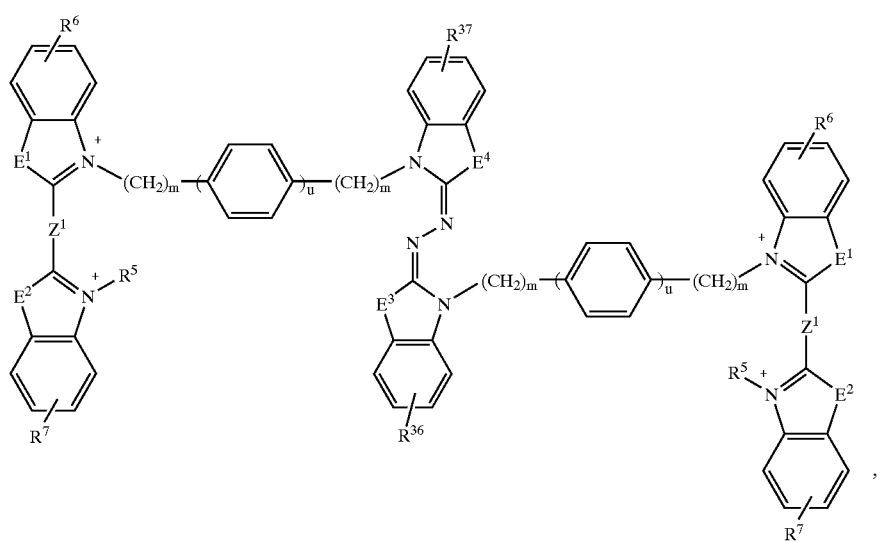
2X⁻  2X⁻

-continued
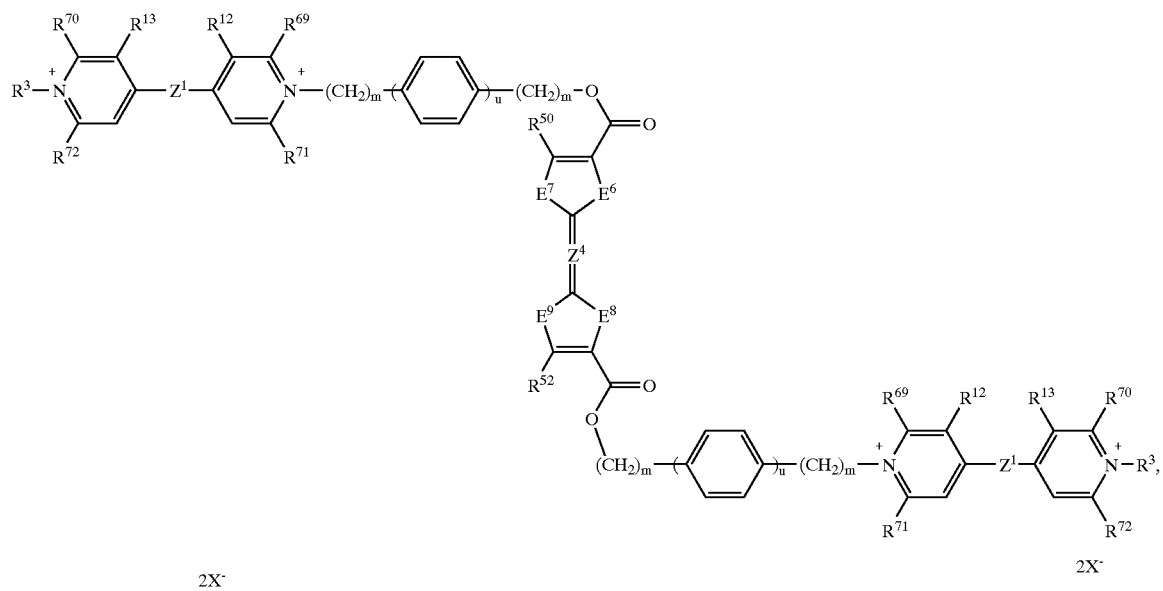
(XXXV)
2X⁻
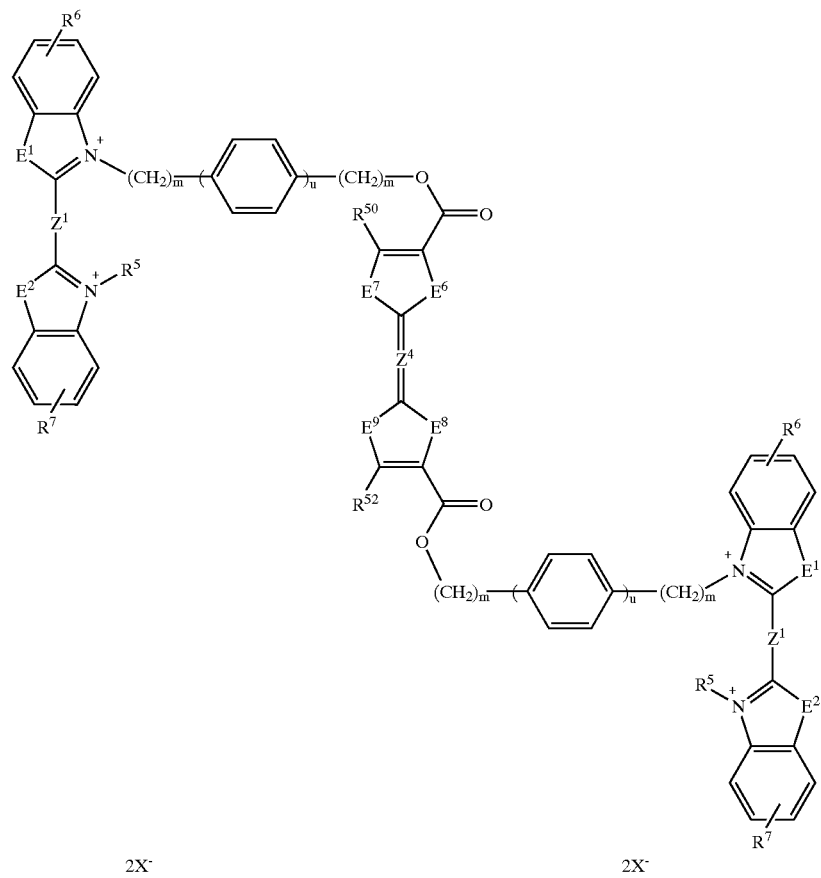
(XXXVI)
2X⁻   2X⁻ or at least one substance of the formula (Ic) corresponding to one of the formulae
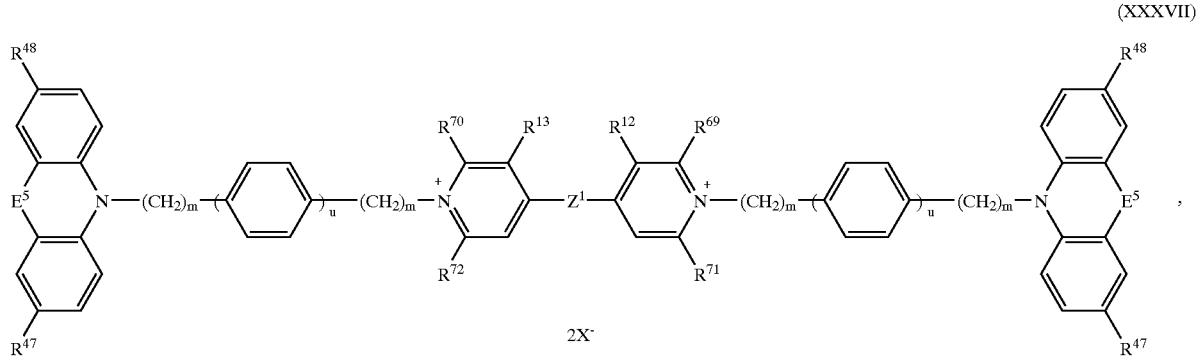
(XXXVII)
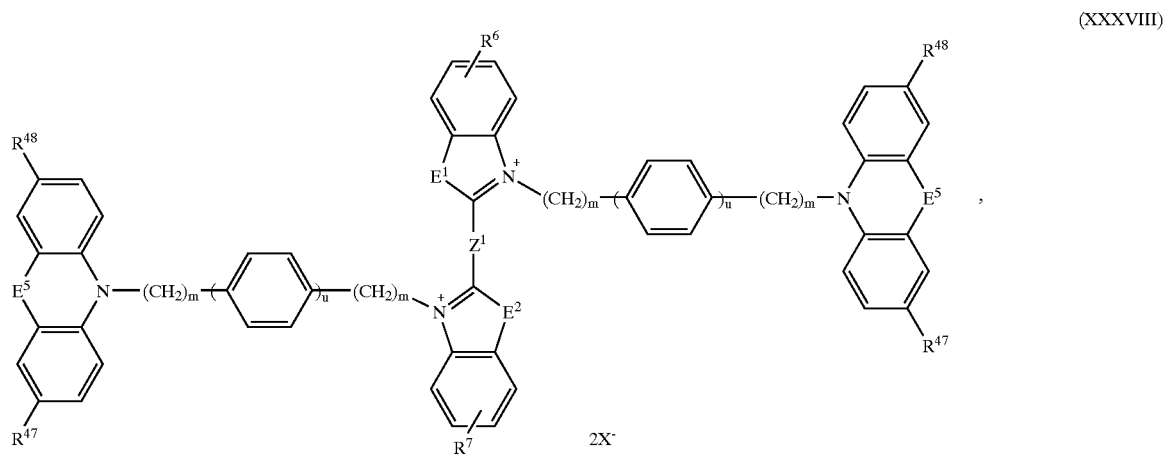
(XXXVIII)
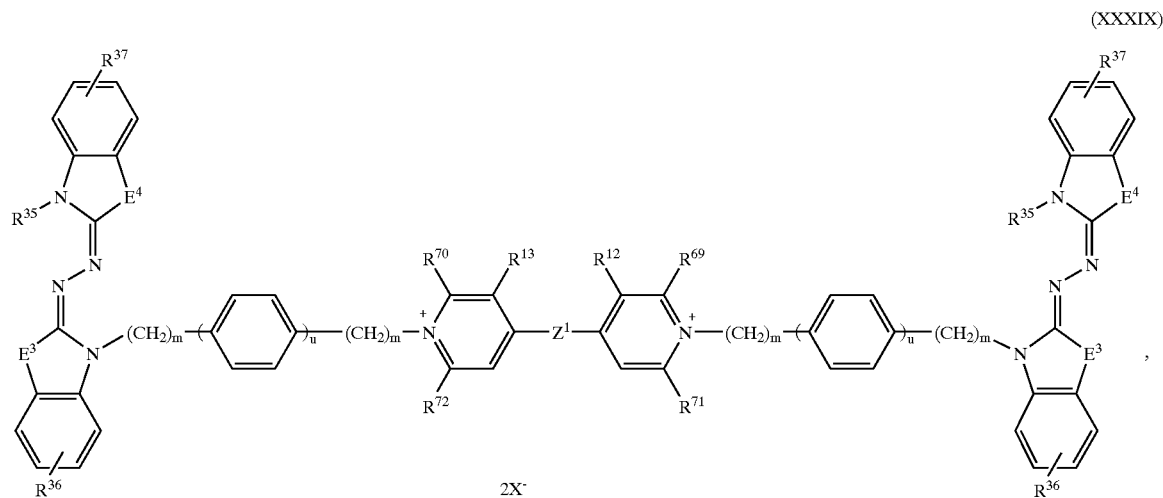
(XXXIX)

-continued
(XL)
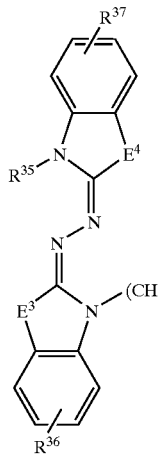 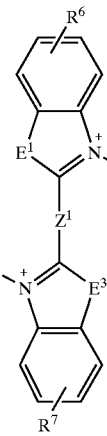 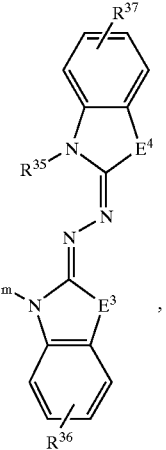
2X⁻
(XLI)
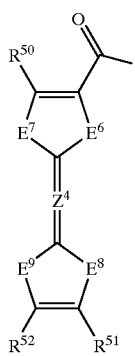 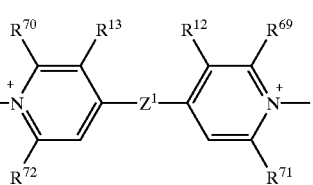 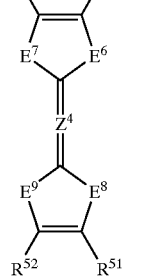
2X⁻
(XLII)
 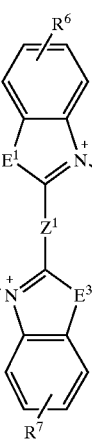 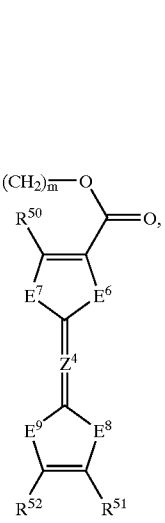
2X⁻
in which
$R^3$, $R^5$, $R^{35}$ and $R^{39}$ independently of one another represent methyl, ethyl, propyl, butyl, pentyl, hexyl or benzyl,
$R^6$, $R^7$ and $R^{36}$, $R^{37}$ in pairs are identical and represent hydrogen, methyl, methoxy, chloro, cyano or methoxycarbonyl, $R^{12}$ and $R^{13}$ represent hydrogen or, if $Z^1$ denotes a direct bond, together represent a —CH=CH— bridge, $R^{69}$ to $R^{72}$ are identical and represent hydrogen or methyl, $E^1$ and $E^2$ are identical and represent O or S, $Z^1$ represents a direct bond or —CH=CH—, $R^{32}$, $R^{47}$ and $R^{48}$ represent hydrogen, $E^3$ to $E^5$ independently of one another represent O, S or $NR^{59}$, but $E^3$ and $E^4$ are identical, $R^{29}$ to $R^{31}$ and and $R^{59}$ independently of one another represent methyl, ethyl, propyl, butyl, pentyl, hexyl or benzyl, where $R^{29}$ to $R^{31}$ are preferably identical, $R^{40}$ and $R^{41}$ are identical and represent hydrogen, methyl, ethyl, propyl, butyl or phenyl, $Z^3$ represents a direct bond, —CH=CH— or —N=N—, $R^{50}$ to $R^{52}$ independently of one another represent hydrogen, methyl, methoxy, chloro, cyano, methoxycarbonyl, ethoxycarbonyl or phenyl, but are preferably identical, $E^6$ to $E^9$ are identical to one another and represent S, Se or $NR^{59}$, $Z^4$ represents a direct double bond, a =CH—CH= or =N—N=bridge, m represents an integer from 1 to 5, u represents 0 or 1, and $X^-$ represents $C_{15}$- to $C_{20}$-alkanesulphonate, $C_5$- to $C_8$-perfluoroalkanesulphonate, mono- or dibutylbenzenesulphonate, mono- or di-tert-butylbenzenesulphonate, octylbenzenesulphonate, dodecylbenzenesulphonate, naphthalenesulphonate, biphenylsulphonate, nitrobenzenedisulphonate, naphthalenedisulphonate, dibutylnaphthalenesulphonate, biphenyldisulphonate, benzoylbenzoate, cyanotriphenylborate, tetra-$C_3$- to $C_8$-alkoxyborate, tetraphenoxyborate, 7,8- or 7,9-dicarba-nido-undecaborate(1-) or (2-) or dodecahydro-dicarbadodecaborate(2-) where in the case of polyvalent anions such as naphthalenedisulphonate $X^-$ represents one equivalent of this anion.

In the abovementioned definitions of substituents alkyl radicals, including modified versions such as alkoxy or aralkyl radicals, for example, are preferably those having 1 to 12 C atoms, especially having 1 to 8 C atoms, unless indicated otherwise. They can be straight-chain or branched and can if desired carry further substituents such as, for example, $C_1$- to $C_4$-alkoxy, fluoro, chloro, hydroxyl, cyano, $C_1$- to $C_4$-alkoxycarbonyl or COOH Cycloalkyl radicals are preferably those having 3 to 7 C atoms, especially 5 or 6 C atoms.

Alkenyl radicals are preferably those having 2 to 8 C atoms, especially 2 to 4 C atoms.

Aryl radicals, including those in aralkyl radicals, are preferably phenyl or naphthyl radicals, especially phenyl radicals. They can be substituted by 1 to 3 of the following radicals. $C_1$- to $C_6$-alkyl, $C_1$- to $C_6$-alkoxy, fluoro, chloro, bromo, cyano, hydroxyl, $C_1$- to $C_6$-alkoxycarbonyl or nitro. Two adjacent radicals can also form a ring, The compounds of the formula (I) are known in principle from the nonprior-published German Application No. 19605451.6 and can be prepared as described therein.

Compounds of the formula (I), which as counterion contain the above-defined anion $X^-$ are novel and are likewise a subject of the present invention.

Owing to their synthesis, the electrochromic compounds obtained in accordance with WO 97/30134 of the formula (I), do not carry any anions $X^-$ of the invention. These anions $X^-$ have to be introduced by means of anion exchange. This exchange can take place, for example, in solvents in which the compounds of the formula (I) with the anions originating from their synthesis are of moderate to good solubility but in which the compounds of the formula (I) with the anions of the invention are of poor solubility. The compounds of the formula (I) with the anions originating from their synthesis are then introduced, together with salts of the anions of the invention, for example the alkali metal salts or tetraalkyl-ammonium salts listed below under conductive salts, into such solvents, and these mixtures are stirred at from room temperature to the reflux temperature of the solvent, the desired compounds of the formula (I) with the anions of the invention being precipitated and being filtered off with suction. Examples of suitable solvents are alcohols such as methanol, ethanol; water; nitriles such as acetonitrile, or mixtures thereof.

Another process involves operating in a two-phase mixture, in which case the compounds of the formula (I) with the anions originating from their synthesis and the alkali metal salts or tetraalkylammonium salts of the anions $X^-$ of the invention should be at least partly soluble in one solvent while the compounds of the formula (I) with the anions $X^-$ of the invention should be readily soluble in the other solvent. This mixture is then stirred at from room temperature to the reflux temperature of the solvent mixture, and is separated. Removal of the second solvent by distillation gives the compounds of the formula (I) with the anions $X^-$ of the invention Examples of suitable pairs of solvents are water/toluene, water/methylene chloride and water/butanone.

A third possibility is the use of ion exchangers.

The electrochromic system of the invention preferably comprises at least one solvent, resulting in an electrochromic fluid which is likewise a subject of the present invention.

Suitable solvents are all solvents which are redox-inert at the chosen voltages and which cannot give off electrophiles or nucleophiles or themselves react as sufficiently strong electrophiles or nucleophiles and so could react with the coloured ionic free radicals. Examples are propylene carbonate, γ-butyrolactone, acetonitrile, propionitrile, glutaronitrile, methylglutaronitrile, 3,3'-oxydipropionitrile, hydroxypropionitrile, dimethylformamide, N-methylpyrrolidone, sulpholane, 3-methylsulpholane or mixtures thereof. Preference is given to propylene carbonate and to mixtures thereof with glutaronitrile or 3-methylsulpholane.

The electrochromic fluid of the invention can include at least one inert conductive salt. It must include a conductive salt if $OX_2$ is not cationic.

Suitable inert conductive salts are lithium, sodium and tetraalkylammonium salts, especially the latter. The alkyl groups can have between 1 and 18 C atoms and can be identical or different. Tetrabutylammonium is preferred. Anions of these salts are the abovementioned anions $X^-$ in their general, particular or very particular definitions.

The conductive salts are preferably employed in the range from 0 to 1 molar.

Further possible additives to the electrochromic fluid are thickeners, in order to control the viscosity of the fluid. This may be important for controlling the rate of fade after switching off the current.

Suitable thickeners are all compounds usual for these purposes, such as polyacrylate, polymethacrylate (Luctite L®), polycarbonate and polyurethane, for example The electrochromic fluid can also be in gel form.

Other suitable additives for the electrochromic fluid are UV absorbers to improve the lightfastness. Examples are Uvinul® 3000 (2,4-dihydroxybenzophenone, BASF), SANDUVOR® 3035 (2-hydroxy-4-n-octyloxybenzophenone, Clariant), Tinuvin® 571 (2-(2H-benzotriazol-2-yl)-6-dodecyl-4-methylphenol, Ciba), Cyasorb 24® (2,2'-dihydroxy-4-methoxybenzophenone, American Cyanamid Company), UVULA® 3035 (ethyl 2-cyano-3,3-diphenylacrylate, BASF), Uvinul® 3039 (2-ethylhexyl 2-cyano-3,3-diphenylacrylate, BASF), UVINUL® 3088 (2-ethylhexyl p-methoxycinnamate, BASF), and CHIMASSORB®90 (2-hydroxy-4-methoxybenzophenone, Ciba).

The UV absorbers are employed in the range from 0.01 to 2 mol/l, preferably from 0.04 to 1 mol/l.

The electrochromic fluid of the invention comprises the substances of the formula (I), especially of the formulae (Ia) to (Id), in each case in a concentration of at least $10^{-4}$ mol/l, preferably from 0.001 to 1 mol/l. It is also possible to employ mixtures of two or more electrochromic substances of the formula (I).

The electrochromic fluids of the invention are eminently suitable as a constituent of an electrochromic device. A further subject of the present invention, accordingly, are electrochromic devices comprising an electrochromic fluid of the invention. The design of an electrochromic device, which may be configured, for example, as a window pane, car sunroof, rearview car mirror or display, is known in principle. The electrochromic device of the invention consists of two transparent glass or plastic plates facing one another, of which one may be mirrored, and whose facing sides have an electroconductive coating of, for example, indium tin oxide (ITO) and between which there is located the electrochromic fluid of the invention. Other suitable conductive materials are antimony-doped tin oxide, fluorine-doped tin oxide, antimony-doped zinc oxide, aluminium-doped zinc oxide, tin oxid; and also conductive organic polymers, such as unsubstituted or substituted polythienyls, polypyrroles, polyanilines, polyacetylene. If one of the plates is mirrored, it can also be used as a conductive layer. The distance between the two plates is generally 0.005–2 mm, preferably 0.02–0.5 mm. The desired distance between the plates is generally established by means of a sealing ring.

In the case where the electrochromic device is an electrochromic display device, at least one of the two conductive layers, or both, are subdivided into electrically separate segments that are contacted individually.

Alternatively, it is possible for only one of the two plates to carry the conductive coating and to be subdivided into segments. The separation of the segments can be effected, for example, by means of mechanical removal of the conductive layer, for example by scoring, scratching, scraping or milling, or chemically, for example by etching using, for instance, a solution of $FeCl_2$ and $SnCl_2$ in hydrochloric acid. This removal of the conductive layer can be locally controlled by means of masks, for example photoresistant masks. Also possible, however, is the production of the electrically separate segments by means of controlled—for example, by means of masks—application—for example, sputtering or printing—of the conductive layer. The contacting of the segments takes place, for example, by means of fine strips of conductive material, by means of which the segment is brought into electrically conducting communication with a contact at the edge of the electrochromic device. These fine contact strips can consist either of the same material as the conductive layer itself and can be prepared, for example, along with said layer at the same time as it is subdivided into segments as described above, or alternatively, in order to improve the conductivity, they can consist of a different material, such as fine metallic conductors made, for example, from copper or silver. A combination of metallic material and the material of the conductive coating is a further possibility. These metallic conductors may, for example, be applied, e.g. bonded, in fine wire form, or else may be printed on. All of these above-described techniques are common knowledge from the production of liquid-crystal displays (LCD).

The displays can be viewed in transmitted light or else reflectively via a mirror coating.

The two plates are laid atop one another with the conductively coated and segmented sides facing, separated by means, for example, of a sealing ring, and are bonded to one another at the edge. The sealing ring may be made, for example, of plastic or thin glass or another material which is inert with respect to the electrochromic fluid. The distance between the plates can also, however, be established by means of different spacers, for example by means of small plastic or glass beads or particular fractions of sand, in which case these spacers are applied together with the adhesive and then together form the sealing ring. The sealing ring includes one or two cutouts which are used to fill the electrochromic device. The distance between the two plates lies between 0.005 and 2 mm, and is preferably from 0.02 to 0.5 mm. In the case of large-surface-area display devices, especially those made of plastic, it may be advantageous to use spacers, for example plastic beads of equal diameter distributed over the area of the display device, to keep the distance between the plates constant.

This display device is filled with an electrochromic fluid via the apertures in the sealing ring, an operation which must be carried out at all times with exclusion of moisture and oxygen. Filling can be carried out, for example, by means of fine cannulas or else by the vacuum filling technique, in which the device and the fluid are placed into a shallow dish and introduced into an evacuable container. This container is evacuated. Then the display device, which includes only one filling aperture, is dipped with said aperture into the liquid. When the vacuum is removed, the liquid is then forced into the display device.

When such electrochromic devices are placed upright in the switched-on state, there is—even after a number of hours or days—no separation of the colours of the coloured species formed at the anode and cathode, e.g. $OX^1$-B-$RED_1$ and $RED_2$-B-$OX_2$. The devices are uniform in colour, show no spotting or striping, and fade rapidly and uniformly after the current is switched off. If, on the other hand, use is made of electrochromic compounds of the formula (I) whose anion is not an anion $X^-$ of the invention, such as tetrafluoroborate, then after just a short time, for example after 1 hour, there is a marked colour separation in the upright electrochromic device. For example, there is a blue stripe at the top end and a yellow stripe at the bottom end, while in the middle the expected mixed colour, green, is observed. After the voltage is switched off only the middle zone fades rapidly, whereas the upper and lower zones remain coloured for a relatively long time, for example for several hours. The same observation is made in the case of electrochromic compounds of the formula (I) whose $OX_2$ is not cationic and hence there is no anion, and yet which are employed in an electrochromic fluid whose conductive salt is not an anion of the invention, e.g. tetrafluoroborate.

In the case of electrochromic display devices, for example segmented displays, when the electrochromic compounds or fluids of the invention are used, no colour separation within the segment is likewise found, even in the case of long periods of operation in the upright position of the device, and there is rapid and complete erasure after the current is switched off, whereas the use of the abovementioned electrochromic substances or fluids not of the invention leads to colour separation and to a very slow erasure of these separated colour regions. Specifically in the case of display devices it is a frequent occurrence that individual segments are switched on for a relatively long period and yet are required to fade rapidly when there is a change in the information to be displayed. The electrochromic compounds and liquids of the invention show significant advantages here over those which comprise anions not of the invention.

The self-erasing single-cell electrochromic device of the invention can in addition to the above-described electrochromic substances of the formulae (I), especially of the formulae (Ia) to (Id), also include other such substances, as are described, for example, in U.S. Pat. No. 4,902,108, Topics in Current Chemistry, Vol. 92, pp. 1–44 (1980) and Angew. Chem. 90, 927 (1978). Such electrochromic substances hail, for example, from the groups indicated above, under the formulae (II) to (XX), in which case none of the radicals listed is able to possess the definition "direct bond to the bridge B". Examples of other suitable electrochromic substances are tetrazolinium salts or salts or complexes of metal ions, e.g. $[Fe(C_5H_5)_2]^{0/1+}$. The admixture of such redox systems may, for example, be advantageous in order to correct the colour in the case of the electrochromic device of the invention, for example of the display, in the switched-on state or to render the said colour more intense.

The anions of such electrochromic co-components are intended to have the definition of $X^-$ in its abovementioned general, particular and very particular definition.

EXAMPLES

Example 1

Preparing an Electrochromic Substance of the Formula (I)

a) 5.0 g of 4,4'-bipyridyl were dissolved in 30 ml of an anhydrous acetonitrile at 50° C. At this temperature, 2.7 g of benzyl bromide were added dropwise over the course of 50 minutes. After 3 h at 50° C. the mixture was cooled and the pale yellow precipitate was filtered off with suction. It was washed with 60 ml of toluene and dried in vacuo. This gave 3.9 g (75% of theory) of the product of the formula

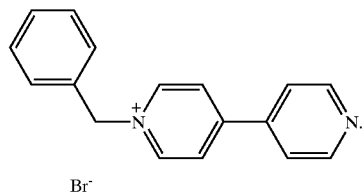

(LXIV)

b) 10.1 g of phenothliazine were dissolved at room temperature in 60 ml of anhydrous N-methylpyrrolidone under an $N_2$ atmosphere. 5.9 g of potassium tert-butylate were added. Heating to 30° C. gave an orange suspension which was stirred at 30° C. for 30 minutes. Then 54 g of 1,4-dibromobutane were added in one portion. Upon this addition the temperature rose to 53° C. The mixture was heated to 70° C. over 45 minutes, held at this temperature for 15 minutes and then cooled. The light brown suspension was introduced into 1 l of water. It was subjected to extraction with 3×200 ml of toluene and the extract was washed with 5×200 ml of water, dried over sodium sulphate and concentrated on a rotary evaporator. The oily residue was dissolved in 400 ml of hexane, insoluble material was removed by filtration, and the remaining solution was concentrated again. The excess 1,4-dibromobutane was then distilled off at from 0.1 to 0.5 mbar. This gave 9.6 g (57% of theory) of a reddish yellow, viscous oil of the formula

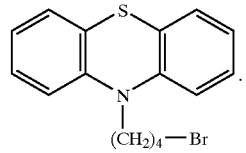

(LXV)

c) 3.7 g of the phenothiazine of the formula (LXV) were dissolved at room temperature in 10 ml of anhydrous N-methylpyrrolidone under an $N_2$ atmosphere. 1.8 g of the dipyridinium salt of the formula (LXIV) were added. The suspension was heated to 80° C. over the course of 1 h and held at this temperature for a total of 13 h. During this time, the suspension became increasingly thicker. After the suspension had cooled to room temperature, it was filtered with suction and the solid product was washed with 5 ml of N-methylpyrrolidone. The hygroscopic crude product of the to formula

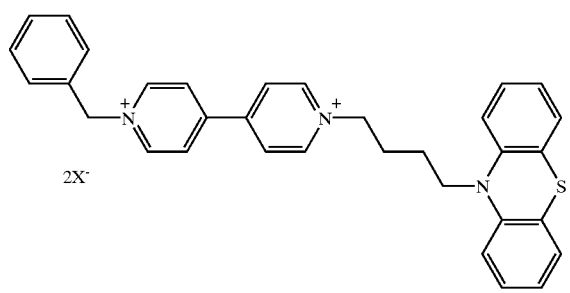

(LXVI)

with $X^-=Br^-$ was dissolved in 7 ml of methanol and the solution was filtered. 3.0 g of sodium cyanotriphenylborate were sprinkled into the filtrate over the course of 2 h. Slowly, precipitation came about, and was brought to completion over the course of 18 h of stirring at room temperature. Finally, the precipitate was filtered off with suction, washed with methanol until the runoff was colourless, and then dried in vacuo. This gave 0.5 g (13% of theory) of pale bluish powder of the formula (LXVI) with $X^-=NC—B(C_6H_5)_3^-$.

In an electrochromic device in accordance with Example 29–30 a blue-violet coloration with $\lambda_{max}=517$ and 606 nm was obtained

Example 2 a) 9.2 g of phenazine were suspended in 60 ml of anhydrous tetrahydrofuran under a nitrogen atmosphere. 30.8 ml of 20% strength by weight phenyllithium solution in 7:3 cyclohexane/diethyl ether were added dropwise over the course of 15 minutes, during which the temperature was held at max. 35° C. The solution was subsequently stirred at room temperature for 30 minutes.

At 15° C., 30.2 ml of 1,4-dibromobutane were added in one portion. Upon this addition the temperature rose to 38° C. After 6 h at room temperature, 200 ml of water were added and the pH was adjusted to 7.0. The organic phase was separated off, washed three times with 100 ml of water each time and concentrated in vacuo. Finally, excess 1,4-dibromobutane was distilled off under a pressure of 0.2 mbar. The oily residue was dissolved hot in 400 ml of ethanol. The product precipitated on cooling was filtered off with suction, washed with ethanol and hexane and dried. This gave 8.0 g (41% of theory) of a pale yellow powder of the 9,10-dihydrophenazine of the formula

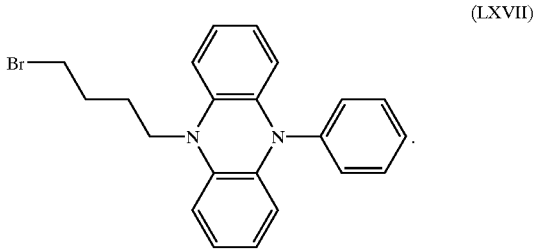

(LXVII)

b) 7.5 g of the 9,10-dihydrophenazine of the formula (LXVII) from a) and 6.1 g of 4,4'-bipyridyl were stirred in 100 ml of acetonitrile at 70° C. under a nitrogen atmosphere for 24 h. After cooling, the mixture was filtered with suction and the solid product was washed with 50 ml of acetone. Drying gave 6.3 g (60% of theory) of the salt of the formula

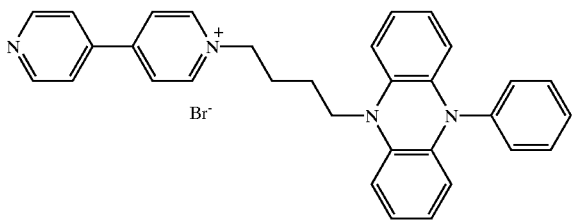

(LXVIII)

c) 6.1 g of the salt obtained in b) were stirred in 70 ml of N-methyl-2-pyrrolidone together with 2.7 ml of benzyl bromide at 70° C. under a nitrogen atmosphere for 7 h. After cooling, the mixture was diluted with 150 ml of toluene and the precipitated product was filtered off with suction. It was washed thoroughly with 150 ml of toluene and 500 ml of hexane and dried. This gave 5.5 g (69% of theory) of the dipyridinium salt of the formula

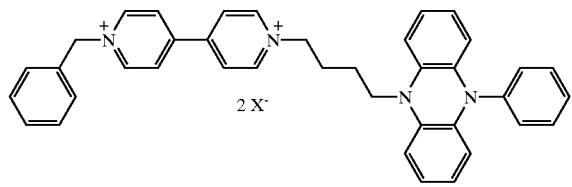

(LXIX)

where $X^-=Br^-$.

d) 4.0 g of this product from c) were introduced under a nitrogen atmosphere into a two-phase mixture comprising 70 ml of water and 70 ml of toluene. 3.6 g of sodium dodecylbenzenesulphonate were added. The mixture was stirred at 50° C. for 2 h and cooled. During this time, the initial cloudy mixture became a clear two-phase system. The toluene phase was separated off and concentrated to dryness in vacuo. This gave 6.7 g of a sticky, pale greenish product of the formula (LXIX) with $X^-=C_{12}H_{25}$—$C_6H_4$—$SO_3^-$.

In an electrochromic device in accordance with Example 29–31 a greenish blue coloration with $\lambda_{max}=466$ and 407 nm was obtained

Example 2a

Comparative Example 4.0 g of this product from Example 2 c) were dissolved at 65° C. in 100 ml of methanol under a nitrogen atmosphere. 7.4 g of tetrabutylammonium tetrafluoroborate were sprinkled in over the course of 5 minutes. Precipitation occurred. After 5 minutes at 65° C. the mixture was cooled and the precipitate was filtered off with suction, washed with 200 ml of methanol and 50 ml of hexane and dried in vacuo. This gave 3.4 g (83% of theory) of a pale beige powder of the formula (LXIX) with $X^-=BF_4^-$.

In an electrochromic device in accordance with Example 29–30 a greenish blue coloration with $\lambda_{max}=466$ and 407 nm was obtained.

Example 3 a) 45.3 g of 2-metlylthiobenzothiazole were dissolved in 75 ml of toluene. 151 ml of 1,4-dibromobutane and a spatula tip of potassium iodide were added. The mixture was boiled for 4 h and then cooled. It was filtered, and the solid product was washed with 50 ml of toluene. The filtrate was heated to 50° C., and 35.9 ml of dimethyl sulphate were added. This mixture was stirred at 50° C. for 8 h and cooled, and the solid product was filtered off with suction and washed with 250 ml of toluene. The product was stirred up in 100 ml of acetone, filtered off with suction again and washed with 300 ml of acetone. Drying in vacuo gave 53.1 g (50% of theory) of the salt of the formula

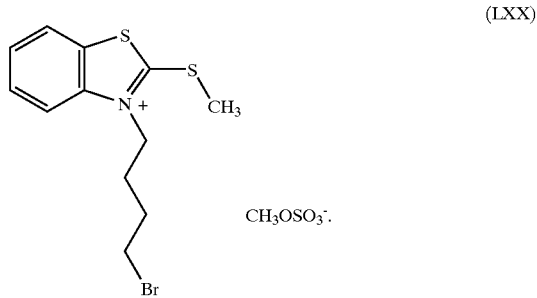

(LXX)

b) Under a nitrogen atmosphere, 6.95 g of the benzothiazolium salt of the formula (LXX) from a) and 2.9 g of the hydrazone of the formula

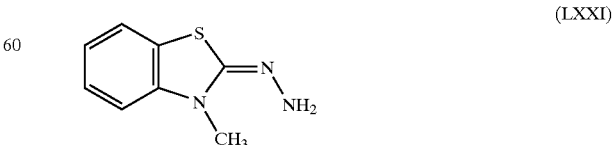

(LXXI)

(from Aldrich Chemical Company Ltd., England) were suspended in 60 ml of acetonitrile. 2.3 ml of triethylamine were added at room temperature. This briefly produced a solution, after which a precipitate formed. After 5 h at room temperature this precipitate was finally filtered off with suction, washed with 50 ml of methanol, 100 ml of water and a further 50 ml of methanol until the runoff was colourless, and was dried in vacuo. This gave 6.0 g (83% of theory) of the azine of the formula

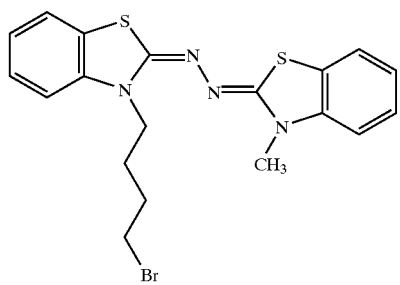

(LXXII)

c) Operating as in Example Ia) but using 6.8 ml of butyl bromide instead of benzyl bromide gave 5.2 g (57% of theory) of the pyridinium salt of the formula

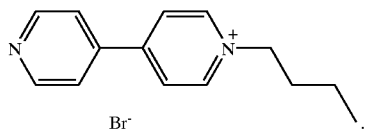

(LXXIII)

d) 2.0 g of the azine of the formula (LXXII) from b) and 1.3 g of the pyridinium salt of the formula (LXXIII) from c) were stirred in 20 ml of N-methyl-2-pyrrolidone at 80° C. under a nitrogen atmosphere for 102 h After the mixture had cooled, a greenish crystalline product was filtered off with suction and washed with 50 ml of acetone. Drying gave 0.25 g (7.6% of theory) of the dipyridinium salt of the formula

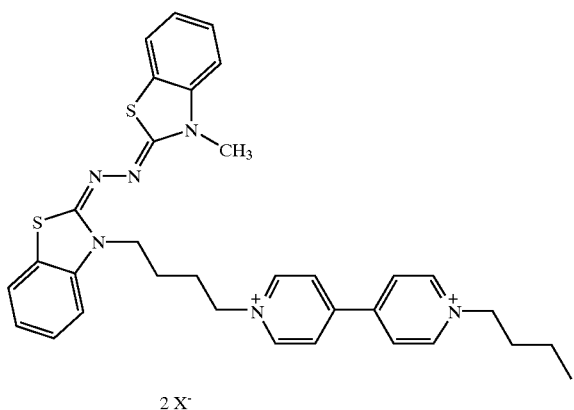

(LXXIV)

with $X^-=Br^-$.

e) 0.25 g of the product from c) was dissolved almost completely in 5 ml of methanol. 0.45 g of sodium cyanotriphenylborate was added. The mixture was stirred at room temperature for 17 h, during which the product gradually became crystalline. This product was filtered off with suction and washed with 25 ml of methanol, 25 ml of water and again with 25 ml of methanol. Drying gave 0.15 g (59% of theory) of a pale grey powder of the formula (LXXIV) with $X^-=NC-B(C_6H_5)_3^-$.

In an electrochromic device in accordance with Example 29–30 a green coloration with $\lambda_{max}=402; 606; 734$ nm was obtained.

Example 4 a) 4.0 g of the phenothiazine of the formula (LXV) from Example Ib) and 0.95 g of 4,4'-bipyridyl were stirred in 10 ml of acetonitrile at 70° C. under a nitrogen atmosphere for 9 h. The suspension was then diluted with 10 ml of N-methyl-2-pyrrolidone and was stirred at 70° C. for 25 h and at 80° C. for 7 h. After cooling, the mixture was filtered with suction and the solid product was washed with 50 ml of methanol and dried in vacuo. This gave 1.6 g (32% of theory) of the dipyridinium salt of the formula

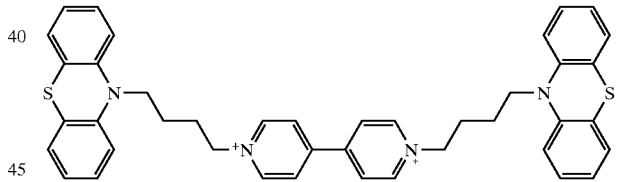

(LXXV)

with $X^-=Br^-$.

b) 1.4 g of the salt of the formula (LXXV) from a) were partly dissolved in 20 ml of methanol under reflux. 2.5 g of sodium tetraphenylborate were added. The mixture was boiled for 5 minutes more and then cooled with stirring. The precipitated product was filtered off with suction, washed with 50 ml of methanol, 50 ml of water and again with 50 ml of methanol and dried in vacuo. This gave 1.1 g (77% of theory) of the dipyridinium salt of the formula (LXXV) with $X^-=B(C_6H_5)_4^-$.

In an electrochromic device in accordance with Example 29–30 a blue-violet coloration with $\lambda_{max}=517$ and 606 nm was obtained.

The examples which follow were prepared in an entirely analogous manner.

| Example | OX$_2$-B-RED$_1$ | Colour | MW Anion | cagelike charge |
|---|---|---|---|---|
| 6 | (structure with phenothiazine, pyridinium groups, benzyl, 2 C$_{15}$H$_{31}$SO$_3^\ominus$) | blue-violet | 291 | − |
| 7 | (structure with phenazine, bipyridinium, CH$_3$ groups, 2-naphthalenesulfonate SO$_3^\ominus$) | greenish blue | 207 | − |
| 8 | (structure with N-phenyl phenazine, bis-benzimidazolium, 2 B$_9$C$_2$H$_{12}^\ominus$) | green | 133 | + |

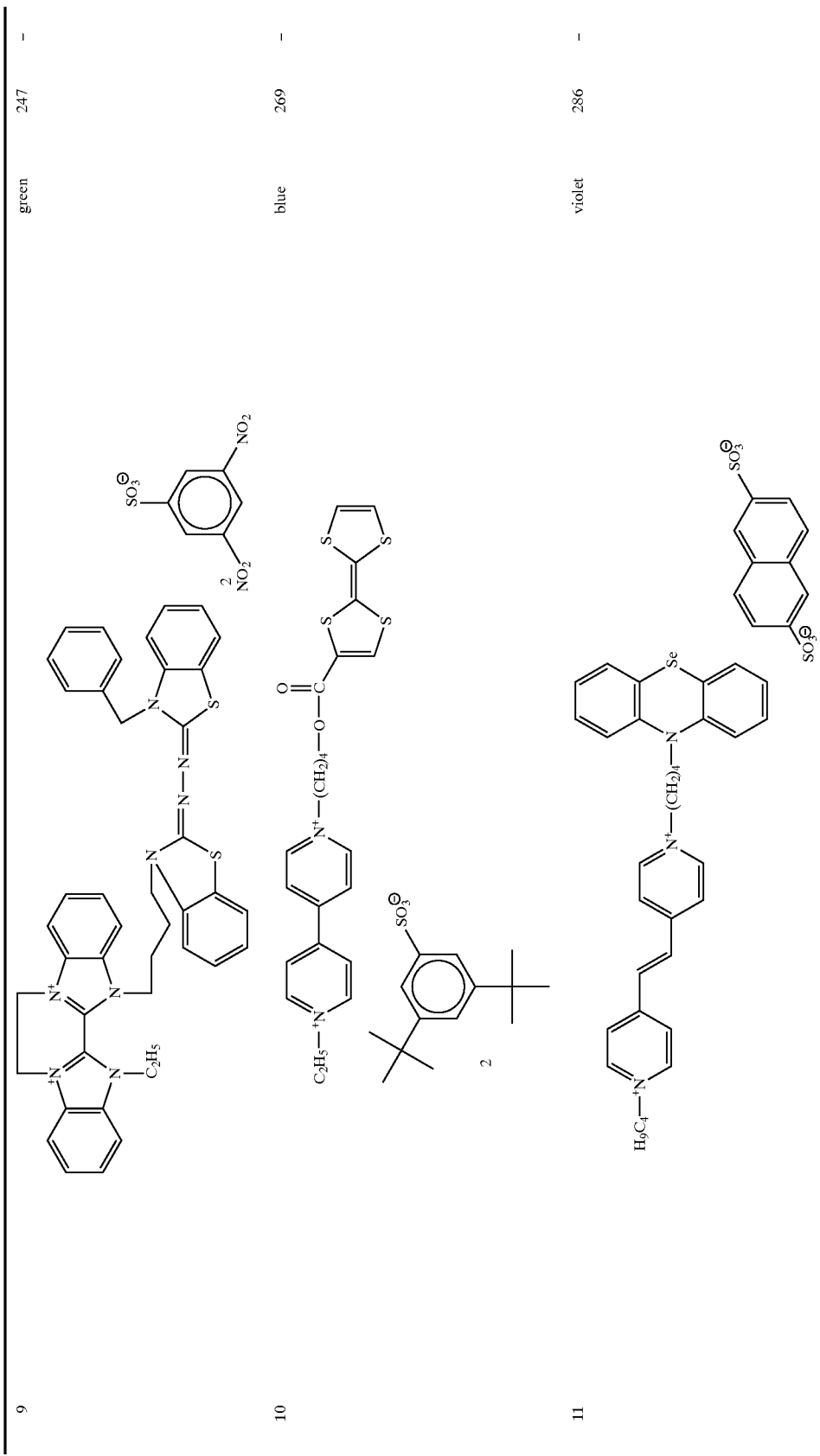

| | | | |
|---|---|---|---|
| 12 | (structure) | blue | 233 | − |
| 13 | (structure) | reddish blue | 318.8 | − |
| 14 | (structure) | green | 147 | + |
| 15 | (structure) | violet | 302.8 | − |

| | | | |
|---|---|---|---|
| 16 | [structure] | green | 267.8 | – |
| 17 | [structure] | green | 283 | – |
| 18 | [structure] | blue | 299 | – |

-continued
| | | | |
|---|---|---|---|
| 19 | 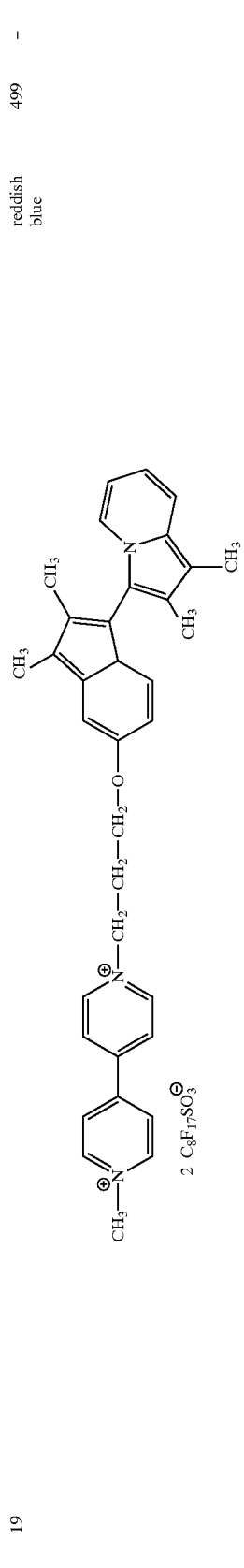 | reddish blue | 499 — |
| 20 | 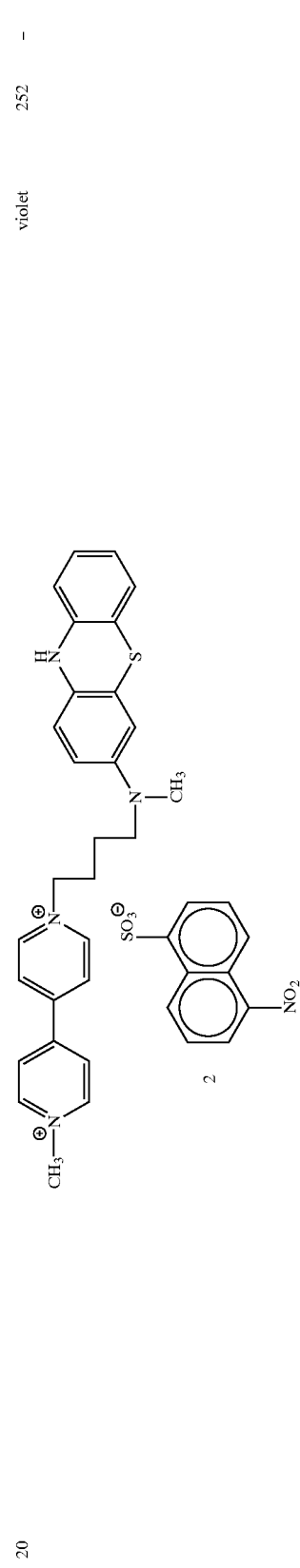 | violet | 252 — |
| Example | RED$_1$-B-OX$_2$-B-RED$_1$ | Colour | MW cagelike<br>Anion charge |
|---|---|---|---|
| 21 | 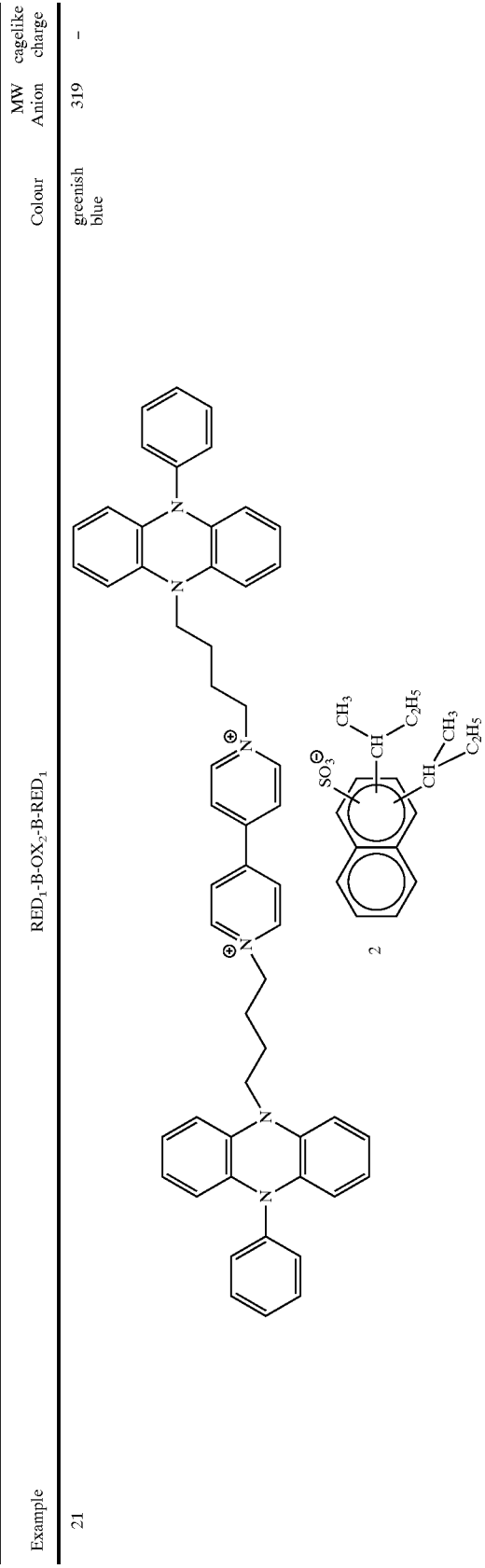 | greenish blue | 319 — |

| Example | | Colour | MW Anion | cagelike charge |
|---|---|---|---|---|
| 22 | [structure with thiophene-COOCH3 groups, benzimidazole core, 2 B9C2H12⁻] | blue | 133 | + |
| 23 | [bis-indole stilbene pyridinium structure with 2 C12H25-SO3⁻] | green | 325 | – |

OX₂-B-RED₁-B-OX₂

| Example | | Colour | MW Anion | cagelike charge |
|---|---|---|---|---|
| 24 | [bipyridinium-benzothiazole structure with 2 biphenyl disulfonate] | greenish blue | 312 | – |

RED₁-B-OX₂-B-RED₁

-continued

| | | | |
|---|---|---|---|
| 25 | [structure] | violet | 382.8 | – |
| 26 | [structure] | green | 225 | – |
| 27 | [structure] | greenish blue | 319 | – |

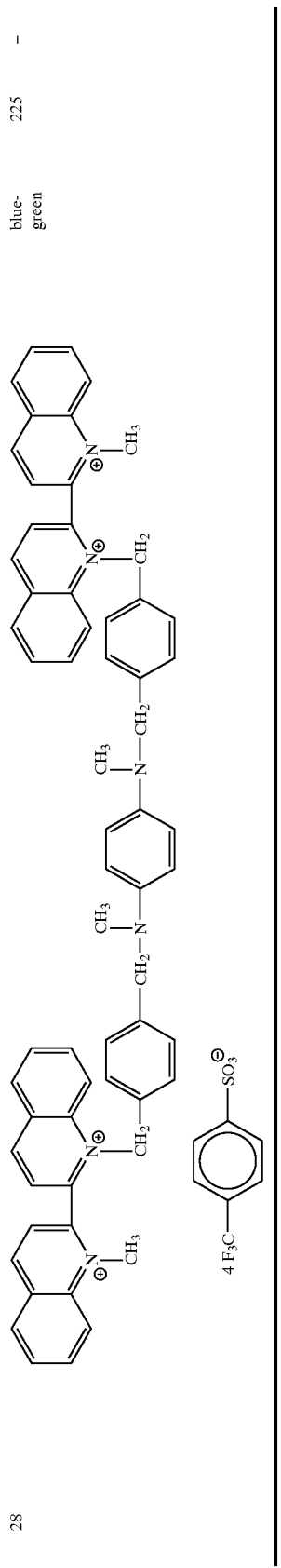

Example 29

A cell as described in U.S. Pat. No. 4,902,108 was constructed from two glass plates, coated with indium tin oxide (ITO), and a sealing ring. Under a nitrogen atmosphere, this cell was filled by way of an aperture in the sealing ring with a 0.03 molar solution in anhydrous glutaronitrile of the electrochromic substance of the formula (LXXIV) with $X^{\ominus}$=NC—B(C$_6$H$_5$)$_3^{\ominus}$ as in Example 3. The cell was sealed so as to be airtight. The solution in the cell was pale yellow. When a voltage of 1.5 V was applied the solution changed colour rapidly to an intense green. When the voltage was switched off, the contents of the cell decoloured fully again within 1 minute. Short-circuiting of the cell resulted in more rapid decolouring.

When the cell was placed upright, the green coloration was still of uniform intensity over the entire cell area even after operation at 1.5 V for 3 h. After being switched off and short-circuited, the cell decoloured rapidly and uniformly over its entire area

Example 30

A cell was constructed as in Example 29. One of the glass plates, however, was mirrored on the side facing away from the ITO coat.

This cell was filled under an N$_2$ atmosphere with a 0.03 molar solution in anhydrous propylene carbonate of the electrochromic substance of the formula (LXIX) with $X^{\ominus}$=C$_{12}$H$_{25}$—C$_6$H$_4$—SO$_3^{\ominus}$ as in Example 2. The colour of the solution in the cell was pale yellow. When a voltage of 0.9 V was applied the solution changed colour rapidly to a deep greenish blue; after the supply of current had been switched off and the cell short-circuited, the contents of the cell decoloured again within about 10 s to give the original pale yellow. More than 100,000 such operating cycles were survived without any changes whatsoever.

When the cell was placed upright, the green coloration was still of uniform intensity over the entire cell area even after operation at 0.9 V for 3 days. After being switched off and short-circuited, the cell decoloured uniformly in the course of 10 s over its entire area.

Example 30a

Comparative Example

The procedure as described in Example 30 was followed but using the electrochromic substance of the formula (LXIX) with X$^-$=BF$_4^-$ as in Example 2a. The colour of the solution in the cell was pale yellow. When a voltage of 0.9 V was applied the solution changed colour rapidly to a deep greenish blue; after the supply of current had been switched off and the cell short-circuited, the contents of the cell decoloured again within 10 s to give the original pale yellow. More than 100,000 such operating cycles were survived without any changes whatsoever.

When the cell was placed upright, within just 1 h a blue stripe was formed at the upper edge of the cell and a greenish yellow stripe at the lower edge of the cell, while the central zone of the cell remained blue. This state was maintained even throughout the course of prolonged operation. The two stripes each made up about ¼ of the vertical height of the cell. After being switched off and short-circuited, the cell decoloured in the course of 10 s in the central zone of the cell. The blue and greenish yellow stripes at the top and bottom, respectively, however, remained. Only after 2–3 h had these stripes too returned completely to their pale coloration.

Example 31

An ITO-coated glass plate was sprayed on the coated side with a commercial photoresist, such as Positiv 20 from Kontakt Chemie, Iffezheim and dried in the dark at 50 to 70° C. for 1 h. The resist coat was then covered with a film containing—as shown in FIG. 1—black segments in a transparent surround. This film was printed with a laser printer to a computer-produced original. The photoresist coat was then exposed through this film to UV light (from a mercury lamp, e.g. HBO 200 W/2 from Osram or from a high-pressure xenon lamp XBO 75 W/2 from Osram) for 1 to 5 minutes. The film was removed and the resist coat was treated in a bath of caustic soda (7 g of sodium hydroxide per litre of water) so that the exposed areas were rinsed away. The pretreated glass plate was then placed in a bath of 67 g of FeCl$_2$×4 H$_2$O, 6 g of SnCl$_2$×2 H$_2$O, 104 ml of water and 113 ml of 37 per cent by weight hydrochloric acid, thereby removing the ITO coat at the resist-free, formerly exposed areas. The remaining resist coat was removed with acetone. This gave a glass plate (1) bearing segments (4), conductor connections (3) and contacts (2).

A rectangular ring was cut out from a 0.2 mm thick polyethylene film. A section about 1–2 cm long was removed (5) from one of its long sides. This film was then placed onto the ITO-coated side of a second glass plate (7). On the outside of the film—with the exception of the aperture (6)—there was applied a two-component adhesive, for example UHU® plus endfest 300 from UHU GmbH, Bühl in Baden. The etched glass plate (I) prepared as described above was then placed onto the film in such a way that the ITO coat lay on the side of the film (see FIG. 2). The two-component adhesive was then cured, if appropriate by gentle heating to about 40° C.

The cell was then filled under a nitrogen or argon atmosphere with a solution of 220 mg of the electrochromic compound of the formula

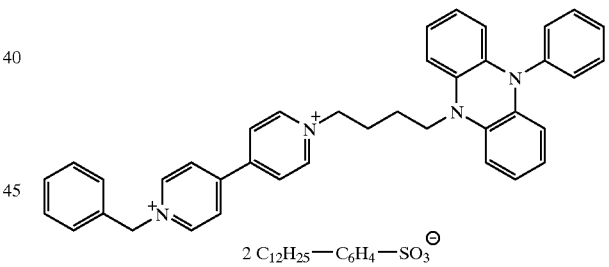

in 10 ml of anhydrous propylene carbonate, which had been prepared under a nitrogen or argon atmosphere, by way of the aperture (6), using, for example, a fine pipette or using vacuum to draw in the solution. The filling aperture (6) was then filled with a matching piece of polyethylene film and sealed tightly with two-component adhesive.

Applying a voltage of 0.8 V to the contacts (2) of the segments, as the cathode, and to the nonetched second plate (7), as the anode, resulted in rapid development of a deep greenish blue image of the contacted segments In this way it was possible to generate all letters and numerals which can be depicted by means of seven segments, in a deep greenish blue on a pale yellow background. Switching off the voltage and short-circuiting the contacts caused the image to disappear again rapidly When this cell was placed upright, the connected segments remained a single colour, without any different-coloured edge stripes whatsoever, even after several hours of operation. After switching off the voltage and short-circuiting the contacts, the segments decoloured rapidly and uniformly.

In full analogy with Examples 29–31, electrochromic cells were constructed using the electrochromic substances set out in Examples 1–28, with similarly good results

What is claimed is:

1. An electrochromic fluid comprising
   (i) an electrochromic system comprising a weakly colored or colorless combination of at least one oxidizable substance $RED_1$ that releases electrons at an anode and in so doing undergoes transition into a substance $OX_1$ and at least one reducible substance $OX_2$ that accepts electrons at a cathode and in so doing undergoes transition into a substance $RED_2$, with the proviso that at least one of $OX_1$ or $RED_2$ is accompanied by an increase in the absorbance in the visible region of the spectrum and thereby becomes colored and the combination is restored to the weakly colored or colorless form after charge equalization, wherein
      (1) at least one of the substances $RED_1$ is linked covalently to at least one of the substances $OX_2$ by a bridge, and
      (2) at least one anion $X^-$ having (a) a molar mass greater than 200 g/mol and/or (b) a cagelike structure is present, and
   (ii) at least one inert solvent.

2. An electrochromic fluid according to claim 1 wherein the anion $X^-$ is the counterion of the reducible substance $OX_2$ and/or a constituent of an inert conductive salt.

3. An electrochromic fluid according to claim 1 wherein the reducible substance $OX_2$ has no positive charge and the anion $X^-$ is a constituent of an inert conductive salt.

4. An electrochromic fluid according to claim 1 wherein the anion $X^-$ is $C_{10}$–$C_{25}$-alkanesulphonate; $C_5$–$C_{18}$-perfluoroalkanesulphonate; $C_{13}$–$C_{25}$-alkanoate; benzenesulphonate substituted by nitro, $C_4$–$C_{25}$-alkyl, perfluoro-$C_1$–$C_8$-alkyl, $C_1$–$C_{12}$-alkoxycarbonyl, or dichloro; naphthalenesulphonate or biphenylsulphonate, each of which is unsubstituted or substituted by nitro, cyano, hydroxyl, $C_1$–$C_{25}$-alkyl, $C_1$–$C_{12}$-alkoxy, amino, $C_1$–$C_{12}$-alkoxycarbonyl, or chloro; benzenesulphonate, naphthalenesulphonate, or biphenyldisulphonate, each of which is unsubstituted or substituted by nitro, cyano, hydroxyl, $C_1$–$C_{25}$-alkyl, $C_1$–$C_{12}$-alkoxy, $C_1$–$C_{12}$-alkoxycarbonyl or chloro; benzoate substituted by dinitro, $C_6$–$C_{25}$-alkyl, $C_4$–$C_{12}$-alkoxycarbonyl, benzoyl, chlorobenzoyl, or toluoyl; the anion of naphthalenedicarboxylic acid; diphenyl ether disulphonate; tetraphenylborate; cyanotriphenylborate, tetra-$C_3$–$C_{20}$-alkoxyborate; tetraphenoxyborate; 7,8- or 7,9-dicarba-nido-undecaborate(1-) or (2-), each of which is unsubstituted or substituted on the B and/or C atoms by one or two $C_1$–$C_{12}$-alkyl or phenyl groups; dodecahydrodicarbadodecaborate(2-); or B—$C_1$–$C_{12}$-alkyl-C-phenyl-dodecahydrodicarbadodecaborate(1-).

5. An electrochromic fluid according to claim 1 comprising at least one electrochromic substance of formula (I)

 (I), wherein

Y and Z independently of one another represent a radical $OX_2$ or $RED_1$, subject to the proviso that at least one Y represents $OX_2$ and at least one Z represents $RED_1$, wherein $OX_2$ represents the radical of a reversibly electrochemically reducible redox system, and $RED_1$ represents the radical of a reversibly electrochemically oxidizable redox system, B represents a bridge, c represents an integer from 0 to 5, and a and b independently of one another represent an integer from 0 to 5.

6. An electrochromic fluid according to claim 1 wherein in formula (I) Y represents $OX_2$ and Z represents $RED_1$ and Y and Z alternate in their sequence.

7. An electrochromic fluid according to claim 1 comprising at least one electrochromic substance of the formulas

 (Ia),

 (Ib),

 (Ic), or

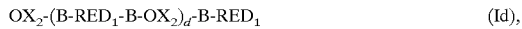 (Id), wherein $OX_2$ represents the radical of a reversibly electrochemically reducible redox system, $RED_1$ represents the radical of a reversibly electrochemically oxidizable redox system, B represents a bridge, and d represents an integer from 1 to 5.

8. An electrochromic fluid according to claim 1 comprising at least one electrochromic substance of the formulas

 (Ia),

 (Ib),

 (Ic), or

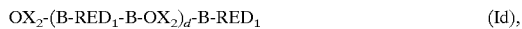 (Id), wherein $OX_2$ represents the radical of a cathodically reducible substance which in its cyclic voltammogram, recorded in an inert solvent at room temperature, exhibits at least two chemically reversible reduction waves, the first of said reduction waves leading to an increase in the absorbance at least one wavelength in the visible region of the electromagnetic spectrum, $RED_1$ represents the radical of an anodically reversibly oxidizable substance which in its cyclic voltammogram, recorded in an inert solvent at room temperature, exhibits at least two chemically reversible oxidation waves, the first of said oxidation waves leading to an increase in the absorbance at least one wavelength in the visible region of the electromagnetic spectrum, B represents a bridge, and d represents an integer from 1 to 5.

9. An electrochromic fluid according to claim 1 comprising at least one electrochromic substance of the formulas

 (Ia),

 (Ib),

 (Ic), or

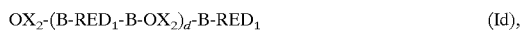 (Id), wherein

OX₂ represents a radical of the formulas

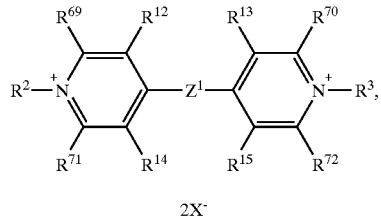
(II)

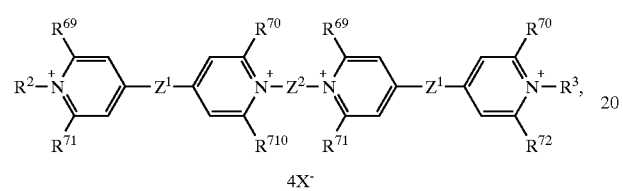
(III)

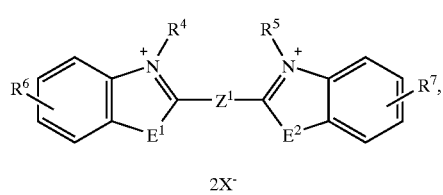
(IV)

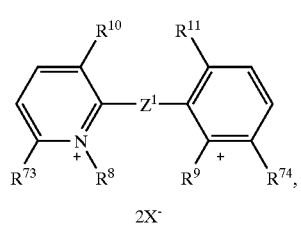
(V)

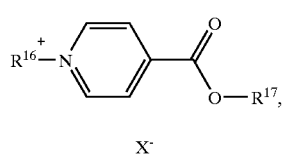
(VI)

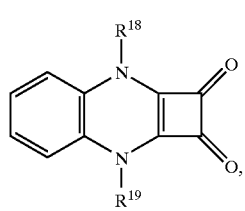
(VII)

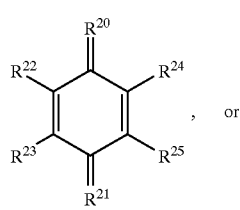
(VIII)

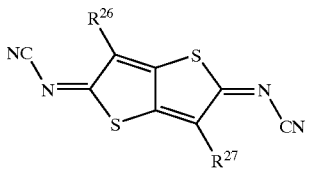
(IX)

wherein
$R^2$, $R^3$, $R^4$, $R^5$, $R^8$, $R^9$, $R^{16}$, $R^{17}$, $R^{18}$, and $R^{19}$ independently of one another denote $C_1$–$C_8$-alkyl, $C_2$14 $C_{12}$-alkenyl, $C_3$–$C_7$-cycloalkyl, $C_7$–$C_{15}$-aralkyl, or $C_6$–$C_{10}$-aryl, or $R^4$ and $R^5$ together or $R^8$ and $R^9$ together form a —(CH$_2$)$_2$— or —(CH$_2$)$_3$— bridge, $R^6$, $R_7$, $R^{22}$, $R^{23}$, $R^{24}$, and $R^{25}$ independently of one another denote hydrogen, $C_1$–$C_4$-alkyl, $C_1$–$C_4$-alkoxy, halogen, cyano, nitro, or $C_1$–$C_4$-alkoxycarbonyl, or $R^{22}$ and $R^{23}$ together and/or $R^{24}$ and $R^{25}$ together form a —CH=CH—CH=CH— bridge, $R^{10}$ and $R^{11}$; $R^{12}$ and $R^{13}$; $R^{14}$ and $R^{15}$ independently of one another denote hydrogen or in pairs denote a —(CH$_2$)$_2$—, —(CH$_2$)$_3$—, or —CH=CH— bridge, $R^{69}$ to $R^{74}$ independently of one another denote hydrogen or $C_1$–$C_6$-alkyl, or $R^{69}$ and $R^{12}$ together and/or $R^{70}$ and $R^{13}$ together form a —CH=CH—CH=CH— bridge, $R^{20}$ and $R^{21}$ independently of one another denote O, N—CN, C(CN)$_2$ or N—$C_6$–$C_{10}$-aryl, $R^{26}$ denotes hydrogen, $C_1$–$C_4$-alkyl, $C_1$- to $C_4$-alkoxy, halogen, cyano, nitro, $C_1$–$C_4$-alkoxycarbonyl, or $C_6$–$C_{10}$-aryl, $E^1$ and $E^2$ independently of one another denote O, S, NR$^1$, or C(CH$_3$)$_2$, or $E^1$ and $E^2$ together form an N—(CH$_2$)$_2$—N bridge, $R^1$ denotes $C_1$–$C_{18}$-alkyl, $C_2$–$C_{12}$-alkenyl, $C_4$–$C_7$-cycloalkyl, $C_7$–$C_{15}$-aralkyl, or $C_6$–$C_{10}$-aryl, $Z^1$ denotes a direct bond, —CH=CH—, —C(CH$_3$)=CH—, —C(CN)=CH—, —CCl=CCl—, —C(OH)=CH—, —CCl=CH—, —C≡C—, —CH=N—N=CH—, —C(CH$_3$)=N—N=C(CH$_3$)—, or —CCl=N—N=CCl—, $Z^2$ denotes —(CH$_2$)$_r$— or —CH$_2$—C$_6$H$_4$—CH$_2$—, r denotes an integer from 1 to 10, and X⁻ represents an anion which is redox-inert under the conditions in which the electrochromic system is used and (a) a molar mass greater than 200 g/mol and/or (b) a cagelike structure is present.

wherein the bond to the bridge B is via one of the radicals $R^2$ to $R^{19}$ or $R^{22}$ to $R^{27}$ or, if $E^1$ or $E^2$ represents NR$^1$, is via the radical $R^1$, said radicals representing a direct bond to bridge B, RED₁ represents a radical of the formulas

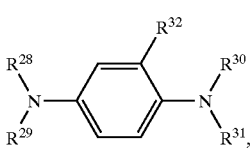
(X)

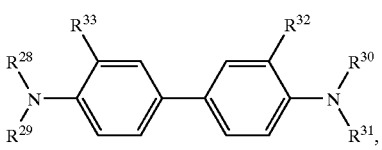
(XI)

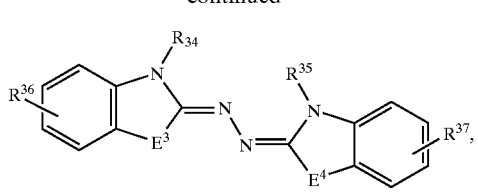 (XII)

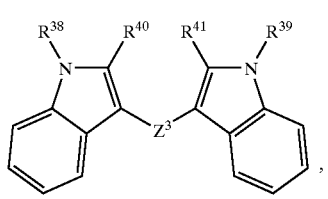 (XIII)

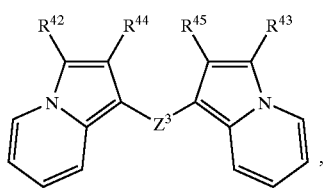 (XIV)

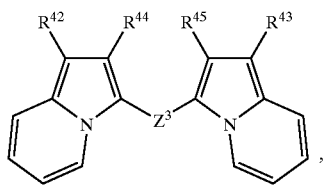 (XV)

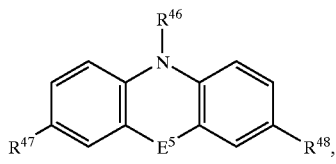 (XVI)

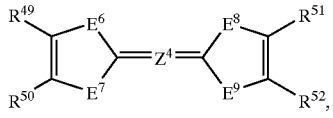 (XVII)

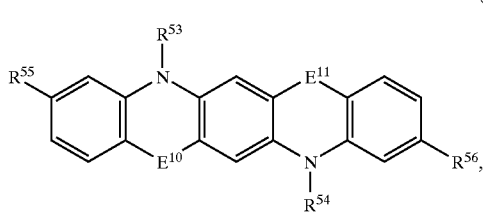 (XVIII)

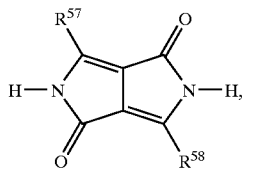 (XIX)

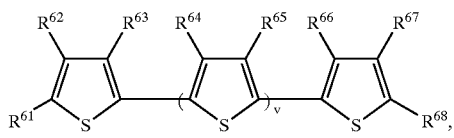 (XX)

wherein $R^{28}$, $R^{29}$, $R^{30}$, $R^{31}$, $R^{34}$, $R^{35}$, $R^{38}$, $R^{39}$, $R^{46}$, $R^{53}$, and $R^{54}$ independently of one another denote $C_1$–$C_{18}$-alkyl, $C_2$–$C_{12}$-alkenyl, $C_3$–$C_7$-cycloalkyl, $C_7$–$C_{15}$-aralkyl, or $C_6$–$C_{10}$-aryl, and $R^{46}$, $R^{53}$, and $R^{54}$ additionally denote hydrogen, $R^{32}$, $R^{33}$, $R^{36}$, $R^{37}$, $R^{40}$, $R^{41}$, $R^{42}$ to $R^{45}$, $R^{47}$, $R^{48}$, $R^{49}$, $R^{50}$, $R^{51}$, $R^{52}$, $R^{55}$, $R^{56}$, and $R^{57}$ independently of one another denote hydrogen, $C_1$–$C_4$-alkyl, $C_1$–$C_4$-alkoxy, halogen, cyano, nitro, $C_1$–$C_4$-alkoxycarbonyl, or $C_6$–$C_{10}$-aryl, and $R^{57}$ and $R^{58}$ additionally denote an optionally benzo-fused aromatic or quasi-aromatic five- or six-membered heterocyclic ring and $R^{48}$ additionally denotes $NR^{75}R^{76}$, $R^{49}$ and $R^{50}$ and/or $R^{51}$ and $R^{52}$ form a —(CH$_2$)$_3$—, —(CH$_2$)$_4$—, —(CH$_2$)$_5$—, or —CH=CH—CH=CH— bridge, $Z^3$ denotes a direct bond, a —CH=CH— or —N=N— bridge, =$Z^4$= denotes a direct double bond or a =CH—CH= or =N—N= bridge, $E^3$, $E^4$, $E^5$, $E^{10}$, and $E^{11}$ independently of one another denote O, S, $NR^{59}$, or $C(CH_3)_2$, and $E^5$ additionally denotes C=O or $SO_2$, or $E^3$ and $E^4$ independently of one another denote —CH=CH—, $E^6$ to $E^9$ independently of one another denote S, Se or $NR^{59}$, $R^{59}$, $R^{75}$, and $R^{76}$ independently of one another denote $C_1$–$C_{12}$-alkyl, $C_2$–$C_8$-alkeny, $C_3$–$C_7$-cycloalkyl, $C_7$–$C_{15}$-aralkyl, or $C_6$–$C_{10}$-aryl, and $R^{75}$ additionally denotes hydrogen, or $R^{75}$ and $R^{76}$ in the definition of $NR^{75}R^{76}$ form, together with the N atom to which they are attached, a five- or six-membered, saturated ring which can contain further heteroatoms, $R^{61}$ to $R^{68}$ independently of one another denote hydrogen, $C_1$–$C_6$-alkyl, $C_1$–$C_4$-alkoxy, cyano, $C_1$–$C_4$-alkoxycarbonyl, or $C_6$–$C_{10}$-aryl, or $R^{61}$ and $R^{62}$ together and $R^{67}$ and $R^{68}$ together independently form a —(CH$_2$)$_4$—, —(CH$_2$)$_4$—, or —CH=CH—CH=CH— bridge, and v denotes an integer between 0 and 10, wherein the bond to the bridge B is via one of the radicals $R^{28}$, $R^{58}$, $R^{61}$, $R^{62}$, $R^{67}$, $R^{68}$ or, if one of the radicals $E^3$ to $E^{11}$ represents $NR^{59}$, is via the radical $R^{59}$, and radicals representing a direct bond to bridge B, B represents a bridge of the formula —(CH$_2$)$_n$— or —[$Y^1{}_s$(CH$_2$)$_m$—$Y^2$]$_o$—(CH$_2$)$_p$—$Y^3{}_q$—, each such bridge being unsubstituted or substituted by $C_1$–$C_4$-alkoxy, halogen or phenyl, wherein $Y^1$ to $Y^3$ independently of one another represent O, S, $NR^{60}$, COO, CONH, NHCONH, cyclopentanediyl, cyclohexanediyl, phenylene, or naphthylene, $R^{60}$ denotes $C_1$–$C_6$-alkyl, $C_2$–$C_6$-alkenyl, $C_4$–$C_7$-cycloalkyl, $C_7$–$C_{15}$-aralkyl, or $C_6$–$C_{10}$-aryl, n denotes an integer from 1 to 12, m and p independently of one another denote an integer from 0 to 8, o denotes an integer from 0 to 6, and q and s independently of one another denote 0 or 1, and d represents an integer from 1 to 5, wherein if the reducible substance $OX_2$ has no positive charge, then anion $X^-$ is a constituent of an inert conductive salt.

10. An electrochromic fluid according to claim 1 comprising at least one electrochromic substance of the formulas OX$_2$-B-RED$_1$ (Ia), OX$_2$-B-RED$_1$-B-OX$_2$ (Ib), RED$_1$-B-OX$_2$-B-RED$_1$ (Ic), or OX$_2$-(B-RED$_1$-B-OX$_2$)$_d$-B-RED$_1$ (Id), wherein OX$_2$ represents a radical of the formulas

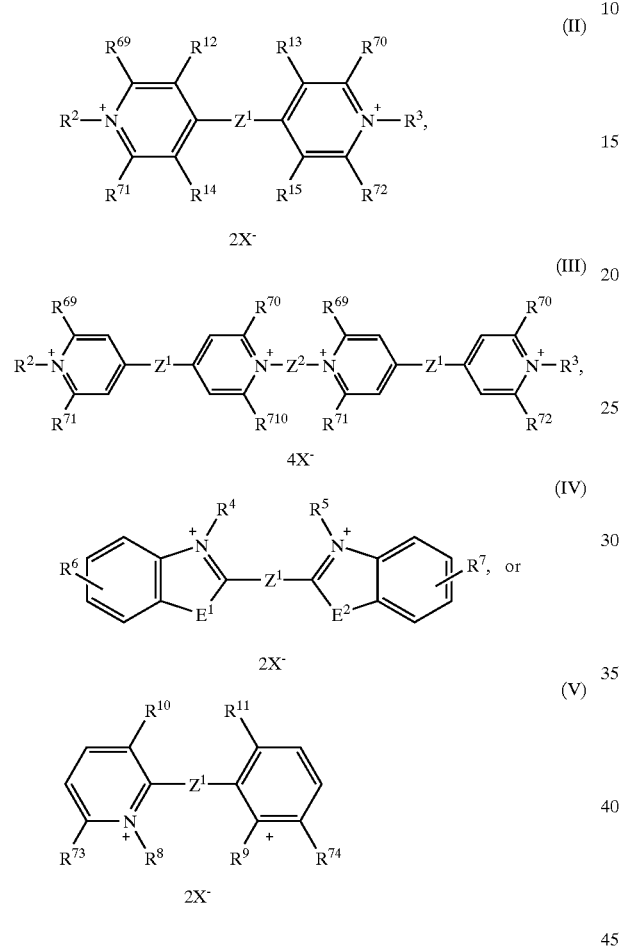

wherein
- $R^2, R^3, R^4, R^5, R^8$, and $R^9$ independently of one another represent C$_1$–C$_{12}$- alkyl, C$_2$–C$_8$-alkenyl, C$_5$–C$_7$-cycloalkyl, C$_7$–C$_{15}$-aralkyl, or C$_6$–C$_{10}$-aryl,
- $R^6$ and $R^7$ independently of one another represent hydrogen, methyl, ethyl, methoxy, ethoxy, fluoro, chloro, bromo, cyano, nitro, methoxycarbonyl, or ethoxycarbonyl,
- $R^{10}$, $R^{11}$; $R^{12}$ $R^{13}$; and $R^{14}$ $R^{15}$ independently of one another denote hydrogen or, if Z$^1$ denotes a direct bond, in pairs denote a —(CH$_2$)$_2$—, —(CH$_2$)$_3$—, or —CH=CH— bridge, or
- $R^4$ $R^5$ and $R^8$, $R^9$ independently of one another in pairs together represent a —(CH$_2$)$_2$— or —(CH$_2$)$_3$— bridge if Z$^1$ denotes a direct bond,
- $R^{69}$ to $R^{74}$ independently of the another denote hydrogen or C$_1$–C$_4$-alkyl,
- E$^1$ and E$^2$ are identical and represent O, S, NR$^1$ or C(CH$_3$)$_2$ or together form an N—(CH$_2$)$_2$—N— bridge,
- R$^1$ represents C$_1$–C$_{12}$-alkyl, C$_2$–C$_4$-alkenyl, C$_5$–C$_7$-cycloalkyl, C$_7$–C$_{15}$-aralkyl, or C$_6$–C$_{10}$-aryl, Z$^1$ represents a direct bond, —CH=CH—, —C(CH$_3$)=CH—, —C(CN)=CH—, —C≡C— or —CH=N—N=CH—, Z$^2$ represents —(CH)$_r$— or —CH$_2$—C$_6$H$_4$—CH$_2$—, r represents an integer between 1 and 6, and X$^-$ represents C$_{10}$–C$_{25}$-alkanesulphonate, C$_5$–C$^{18}$-perfluoroalkanesulphonate; C$_{13}$–C$_{25}$-alkanoate; benzenesulphonate substituted by nitro, C$_4$–C$_{25}$-alkyl, perfluoro-C$_1$–C$_8$-alkyl, alkoxycarbonyl, or dichloro; naphthalenesulphonate or biphenysulphonate, each of which is unsubstituted or substituted by nitro, cyano, hydroxyl, C$_1$–C$_{25}$-alkyl, C$_{1-C12}$-alkoxy, amino, C$_1$–C$_{12}$-alkoxycarbonyl, or chloro; benzenesulphonate, naphthalenesulphonate, or biphenyldisulphonate, each of which is unsubstituted or substituted by nitro, cyano, hydroxyl, C$_1$–C$_{25}$-alkyl, C$_1$–C$_{12}$-alkoxy, C$_1$–C$_{12}$-alkoxycarbonyl or chloro; benzoate substituted by dinitro, C$_6$–C$_{25}$-alkyl, C$_4$–C$_{12}$-alkoxycarbonyl, benzoyl, chlorobenzoyl, or toluoyl; the anion of naphthalenedicarboxylic acid; diphenyl ether disulphonate; tetraphenylborate; cyanotriphenylborate, tetra-C$_3$–C$_{20}$-alkoxyborate; tetraphenoxyborate; 7,8- or 7,9-dicarbanido-undecaborate(1-) or (2-), each of which is unsubstituted or substituted on the B and/or C atoms by one or two C$_1$–C$_{12}$-alkyl or phenyl groups; dodecahydrodicarbadodecaborate(2-); or B—C$_1$–C$_{12}$-alkyl-C-phenyl-dodecahydrodicarbadodecaborate(1-), wherein the bond to the bridge B is via one of the radicals R$^2$ R$^{11}$ or, if E$^1$ or E$^2$ represents NR$^1$, is via R$^1$, and the abovementioned radicals in that case represent a direct bond, to bridge B, RED$_1$ represents a radical of the formulas

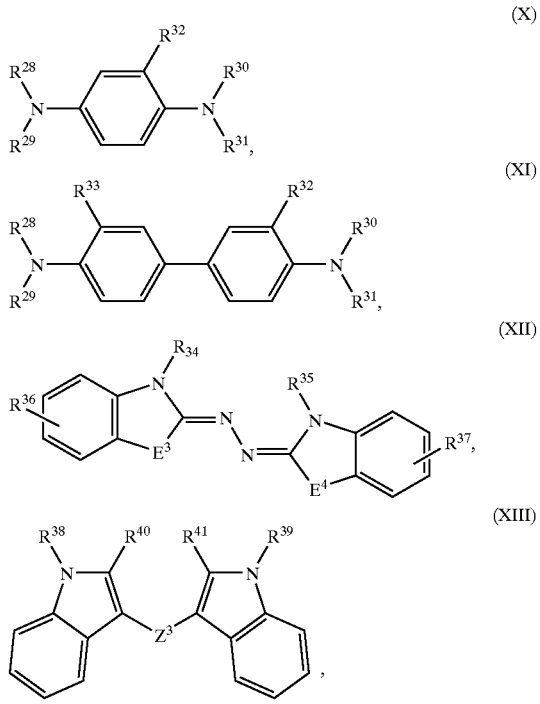

-continued

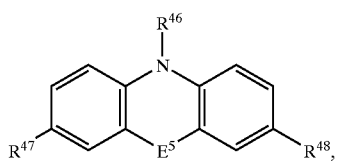
(XVI)

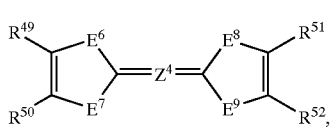
(XVII)

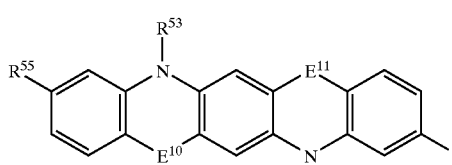
(XVIII)

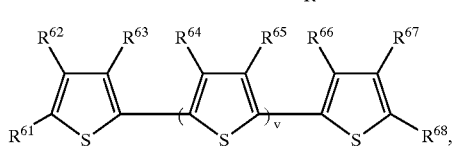
(XX)

wherein
$R^{28}$, $R^{29}$, $R^{31}$, $R^{34}$, $R^{35}$, $R^{38}$, $R^{39}$, $R^{46}$, $R^{53}$, and $R^{54}$ independently of one another denote $C_1$–$C_{12}$-alkyl, $C_2$–$C_8$-alkenyl, $C_5$–$C_7$-cycloalkyl, $C_7$–$C_{15}$-aralkyl or $C_6$–$C_{10}$-aryl, and $R^{46}$, $R^{53}$, and $R^{54}$ additionally denote hydrogen, $R^{32}$, $R^{33}$, $R^{36}$, $R^{37}$, $R^{40}$, $R^{41}$, $R^{47}$, $R^{48}$, $R^{49}$, $R^{50}$, $R^{51}$, $R^{52}$, $R^{55}$, and $R^{56}$ independently of one another denote hydrogen, methyl, ethyl, methoxy, ethoxy, fluoro, chloro, bromo, cyano, nitro, methoxycarbonyl, ethoxycarbonyl or phenyl, and $R^{57}$ and $R^{58}$ additionally denote 2- or 4-pyridyl, and $R^{48}$ additionally denotes $NR^{75}R^{76}$, $Z^3$ denotes a direct bond, a —CH=CH— or —N=N— bridge, =$Z^4$= denotes a direct double bond, a =CH—CH= or =N—N= bridge, $E^3$, $E^4$, $E^5$, $E^{10}$ and $E^{11}$, independently of one another denote O, S, $NR^{59}$ or, $C(CH_3)_2$, but $E^3$ and $E^4$ have the same meaning, $E^6$ to $E^9$ are identical to one another and denote S, Se or $NR^{59}$, and $E^5$ additionally denotes C=O, $E^6$ represents $NR^{59}$, where $R^{59}$ denotes a direct bond to the bridge B, and $E^7$ to $E^9$ denote S, Se, or $NR^{59}$ but need not be identical to one another, $R^{59}$, $R^{75}$, and $R^{76}$ independently of one another denote $C_1$–$C_{12}$-alkyl, $C_2$–$C_8$-alkenyl, $C_5$–$C_7$-cycloalkyl, $C_7$–$C_{15}$-aralkyl or $C_6$–$C_{10}$-aryl, and $R^{75}$ additionally denotes hydrogen, or $R^{75}$ and $R^{76}$ in the definition of $NR^{75}R^{76}$ denote, together with the N atom to which they are attached, pyrrolidino, piperidino or morpholino, $R^{61}$ $R^{62}$ and $R^{67}$ $R^{68}$ independently of one another represent hydrogen, $C_1$–$C_4$-alkyl, methoxycarbonyl, ethoxycarbonyl or phenyl, or in pairs together represent a —(CH$_2$)$_3$— or —(CH$_2$)$_4$— bridge, $R^{63}$ to $R^{66}$ represent hydrogen, and v represents an integer from 1 to 6, wherein the bond to the bridge B is via one of the radicals $R^{28}$ to $R^{41}$, $R^{46}$ $R^{56}$, $R^{61}$, $R^{62}$, $R^{67}$, $R^{68}$ or, if one of the radicals $E^3$–$E^{11}$ represents $NR^{59}$, is via $R^{59}$, and the abovementioned radicals in that case represent a direct bond, B, represents a bridge of the formulae —(CH$_2$)$_n$—, —(CH$_2$)$_m$—O—(CH$_2$)$_p$—, —(CH)$_m$—NR$^{60}$—(CH$_2$)$_p$—, —(CH$_2$)$_m$—C$_6$H$_4$—(CH$_2$)$_p$—, —[O—(CH$_2$)$_p$]$_o$—O—, —[NR$^{60}$—(CH$_2$)$_p$]$_o$—NR$^{60}$—, —[C$_6$H$_4$—(CH$_2$)$_p$]$_o$—C$_6$H$_4$—, —(CH$_2$)$_m$—OCO—C$_6$H$_4$—COO—(CH$_2$)$_p$—, —(CH$_2$)$_m$—NHCO—C$_6$H$_4$—CONH—(CH$_2$)$_p$—, —(CH$_2$)$_m$—NHCONH—C$_6$H$_4$NHCONH—(CH$_2$)$_p$—, —(CH$_2$)$_m$—OCO—(CH$_2$)$_t$—COO—(CH$_2$)$_p$—, —(CH$_2$)$_m$—NHCO—(CH$_2$)$_t$—CONH—(CH)$_p$—, or —(CH$_2$)$_m$—NHCONH—(CH$_2$)$_t$—NHCONH—(CH$_2$)$_p$—, wherein
$R^{60}$ represents methyl, ethyl, benzyl or phenyl,
n represents an integer from 1 to 10,
m and p independently of one another represent an integer from 0 to 4,
o represents an integer from 0 to 2, and
t represents an integer from 1 to 6.
d represents an integer from 1 to 5.

11. An electrochromic fluid according to claim 1 comprising at least one electrochromic substance of the formulas

| | |
|---|---|
| OX$_2$-B-RED$_1$ | (Ia), |
| OX$_2$-B-RED-$_1$-B-OX$_2$ | (Ib), |
| RED$_1$-B-OX$_2$-B-RED$_1$ | (Ic), |
| OX$_2$-(B-RED$_1$-B-OX$_2$)$_d$-B-RED$_1$ | (Id), | wherein
OX$_2$ represents a radical of the formulas

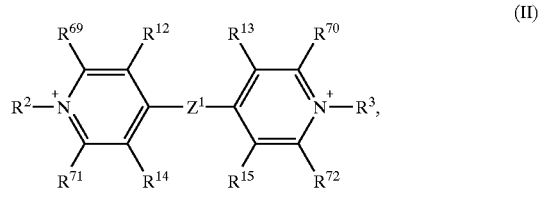
(II)

2X$^-$

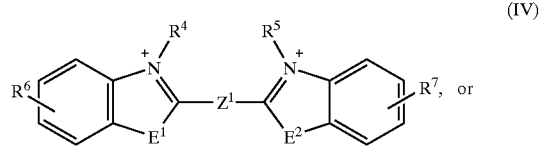
(IV)

2X$^-$

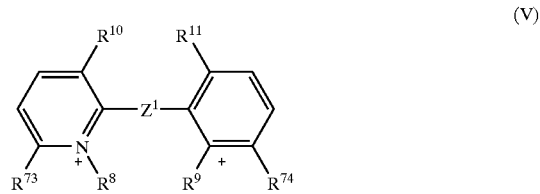
(V)

2X$^-$ wherein $R^2$, $R^4$, and $R^8$ represent a direct bond to the bridge B, $R^3$, $R^5$, and $R^9$ independently of one another represent methyl, ethyl, propyl, butyl, pentyl, hexyl, heptyl, octyl, benzyl or phenyl, or $R^3$, $R^5$, and $R^9$ in the case of the formulae Ic and Id also represent a direct bond to the bridge B, $R^6$ and $R^7$ are identical and represent hydrogen, methyl, methoxy, chloro, cyano or methoxycarbonyl, $R^{10}$ $R^{11}$; $R^{12}$ $R^{13}$; and $R^{14}$ $R^{15}$ independently of one another represent hydrogen or, if $Z^1$ denotes a direct bond, represent, in each case in pairs together, a —CH=CH— bridge, $R^{69}$ to $R^{72}$ are identical and denote hydrogen, methyl or ethyl, $R^{73}$ and $R^{74}$ denote hydrogen, $E^1$ and $E^2$ are identical and represent O or S, $Z^1$ represents a direct bond or —CH=CH—, $X^{31}$ represents $C_{15}$–$C_{22}$-alkanesulphonate, $C_8$–$C_{12}$-perfluoroalkane-sulphonate, nitrobenzenesulphonate, dinitrobenzenesulphonate, mono- or bis-$C_4$–$C_{12}$-alkylbenzenesulphonate, dichlorobenzene-sulphonate, naphthalenesulphonate, nitronaphthalenesulphonate, dinitronaphthalenesulphonate, mono- or bis-$C_3$–$C_{12}$-alkylnaphthalenesulphonate, hydroxynaphthalenesulphonate, aminonaphthalenesulphonate, biphenylsulphonate, benzenedisulphonate, nitrobenzenedisulphonate, $C_4$–$C_{12}$-alkylbenzenedisulphonate, naphthalenedisulphonate, nitronaphthalenedisulphonate, $C_4$–$C_{12}$-alkylnaphthalenedisulphonate, biphenyldisulphonate, dinitrobenzoate, mono- or bis-$C_8$- to $C_{12}$-alkylbenzoate, $C_614$ $C_{12}$-alkoxycarbonyl-benzoate, benzylbenzoate, toluoylbenzoate, the anion of naphthalenedicarboxylic acid, cyanotriphenylborate, tetra-$C_4$–$C_{12}$-alkoxyborate, tetraphenoxyborate, 7,8- or 7,9-dicarba-nido-unde-caborate(1-) or (2-) each of which is unsubstituted or substituted on the B and/or C atoms by one or two methyl, ethyl, butyl or phenyl groups, dodecahydrodicarbado-decaborate(2-) or B-methyl-C-phenyl-dodecahydrodi-carbadodecaborate(1-), with the proviso that for polyvalent anions $X^-$ represents one equivalent of this anion, $RED_1$ represents a radical of the formulas

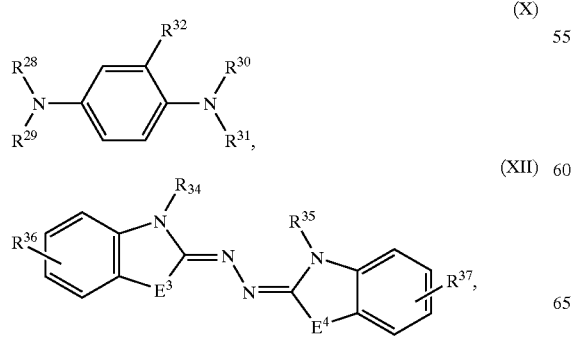

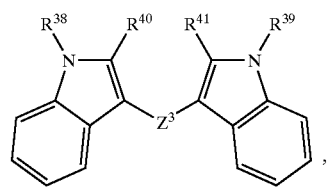

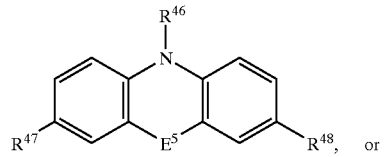

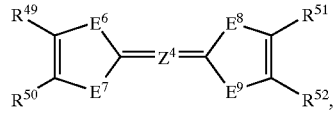

wherein $R^{28}$, $R^{34}$, $R^{38}$, $R^{46}$ and $R^{49}$ represent a direct bond to the bridge B, $R^{29}$ to $R^{30}$, $R^{31}$, $R^{35}$ and $R^{39}$ independently of one another represent methyl, ethyl, propyl, butyl, pentyl, hexyl, heptyl, octyl, benzyl or phenyl, or, in compounds of the formula (Ib) or (Ic), $R^{30}$, $R^{35}$, and $R^{39}$ also represent a direct bond to the bridge B, $R^{32}$, $R^{47}$ and $R^{48}$ represent hydrogen, $R^{36}$, $R^{37}$, $R^{40}$, $R^{41}$ and $R^{50}$ to $R^{52}$ independently of one another represent hydrogen, methyl, methoxy, chloro, cyano, methoxycarbonyl or phenyl, or in compounds of the formula (Ib) or (Id), $R^{51}$ also represents a direct bond to the bridge B, $Z^3$ represents a direct bond, a —CH=CH— or —N=N— bridge, =$Z^4$= represents a direct double bond, a =CH—CH= or =N—N= bridge, $E^3$ to $E^5$ independently of one another represent O, S or $NR^{59}$, but $E^3$ and $E^4$ have the same meaning, $E^6$ to $E^9$ are identical to one another and represent S, Se or $N^{59}$, and $R^{59}$ represents methyl, ethyl, propyl, butyl, pentyl, hexyl, heptyl, octyl, benzyl or phenyl, or, in formula (XVI) of compounds of formula Ib or Id, also represents a direct bond to the bridge B, B represents a bridge of the formulae —$(CH_2)_n$—, —$(CH_2)_m$—O$(CH_2)_p$—, —$(CH_2)_m$—$NR^{60}$—$(CH_2)_p$—, —$(CH_2)_m$—$C_6H_4$—$(CH_2)_p$—, —O—$(CH_2)_p$—O—, —$NR^{60}$—$(CH_2)_p$—$NR^{60}$—, $(CH_2)_m$—OCO—$C_6H_4$—COO—$(CH_2)_p$—, —$(CH_2)_m$—NHCO—$C_6H_4$—CONH—$(CH_2)_p$—, —$(CH_2)_m$—NHCONH—$C_6H_4$—NHCONH —$(CH_2)_p$—, —$(CH_2)_m$—OCO—$(CH_2)_t$—COO—$(CH_2)_p$—, —$(CH_2)_m$—NHCO—$(C_2)_t$—CONH—$(CH_2)_p$—, —$(CH_2)_m$—NHCONH—$(CH_2)_t$—NHCONH—$(CH_2)_p$—, wherein $R^{60}$ represents methyl, n represents an integer from 1 to 10, m and p are identical and represent an integer from 0 to 2, and t represents an integer from 1 to 6, and d represents an integer from 1 to 5, 12. An electrochromic system according to claim 1 comprises at least one electrochromic substance of the formulas

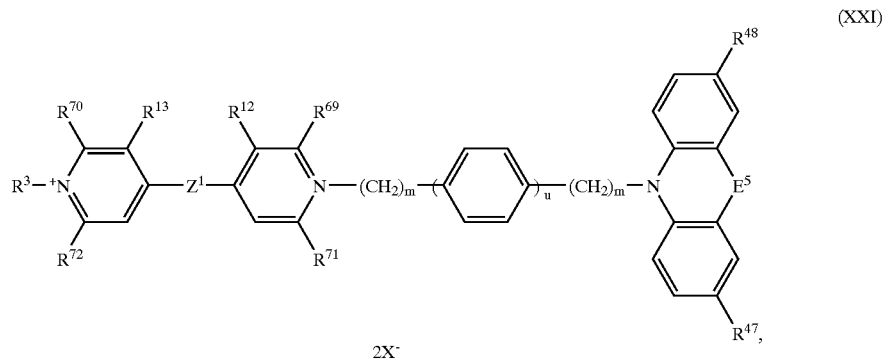
(XXI)
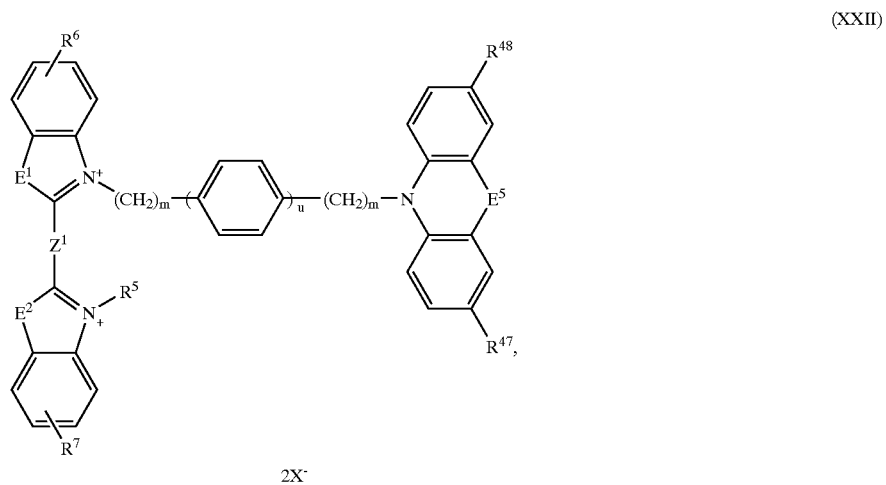
(XXII)
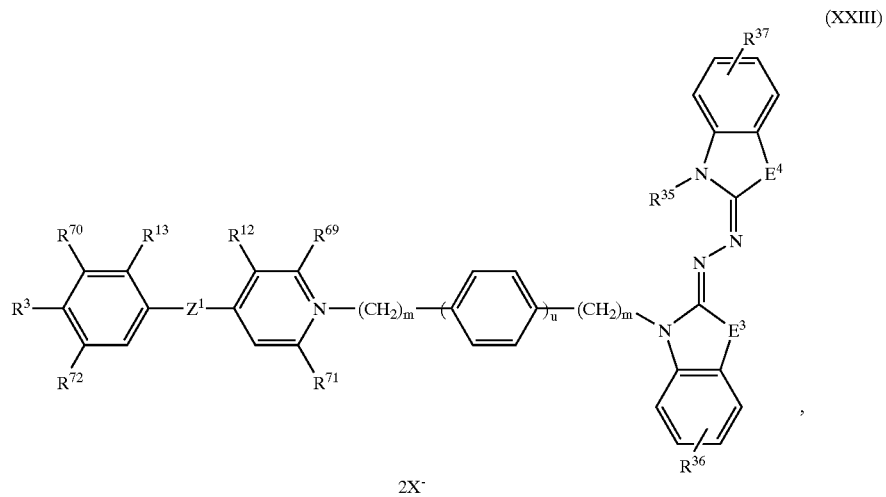
(XXIII)

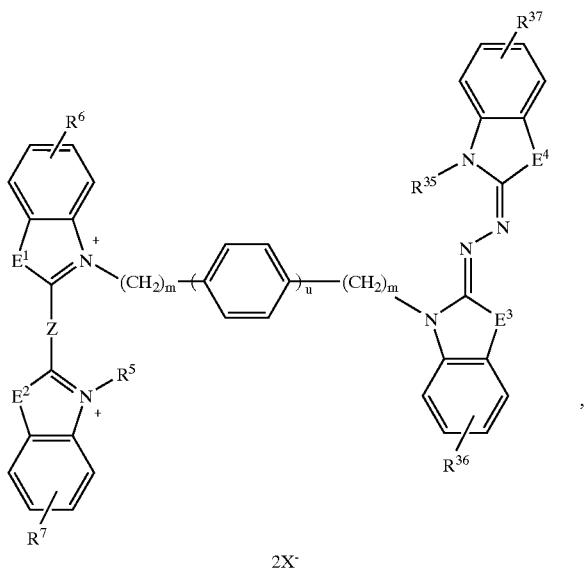
(XXIV)
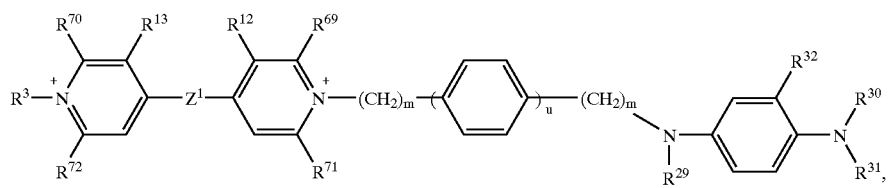
(XXV)
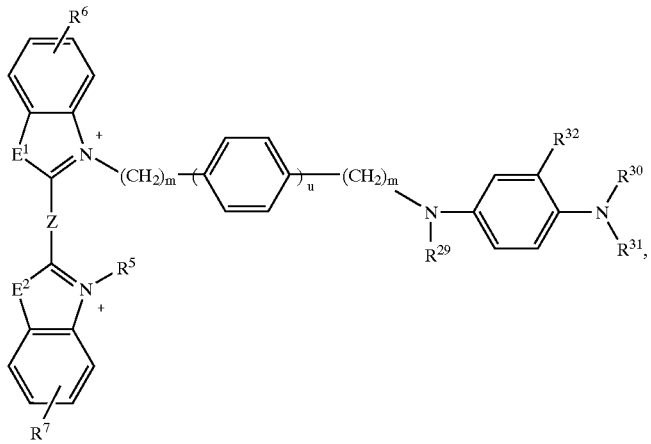
(XXVI)
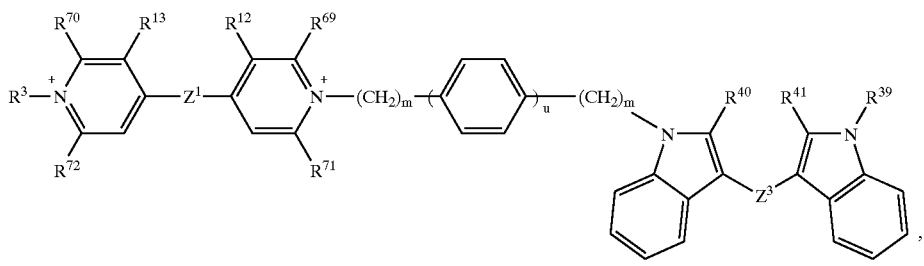
(XXVII)

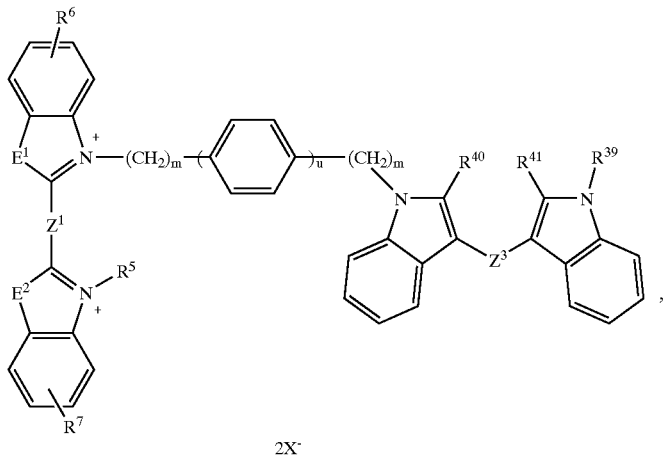
(XXVIII)
2X⁻
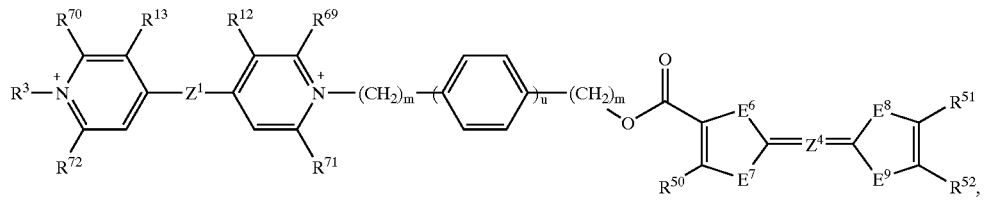
(XXIX)
2X⁻
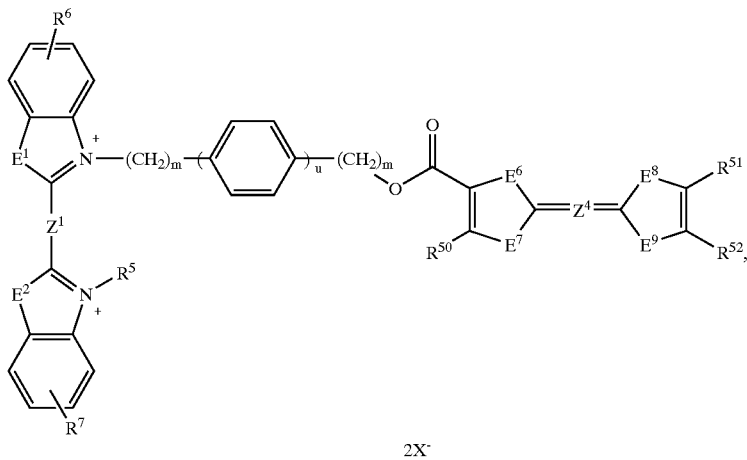
(XXX)
2X⁻
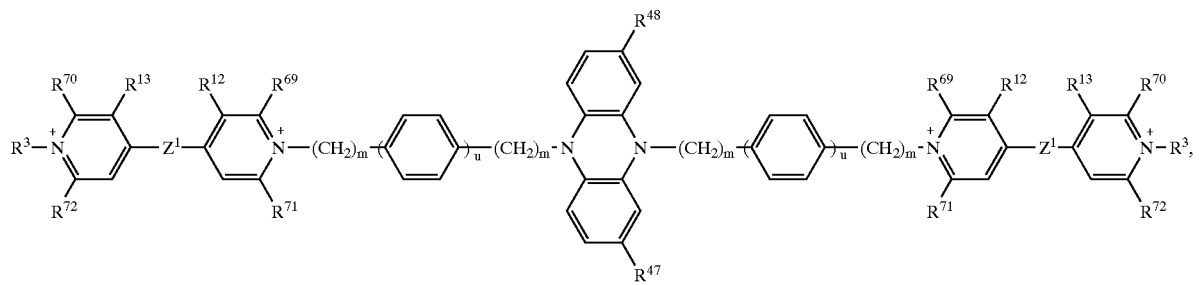
(XXXI)
2X⁻                                2X⁻

(XXXII)
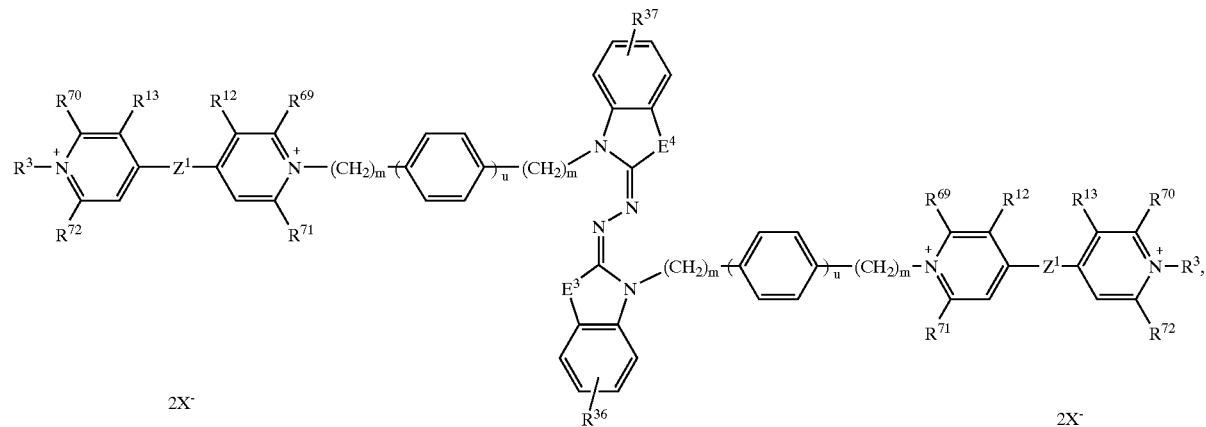
(XXXIII)
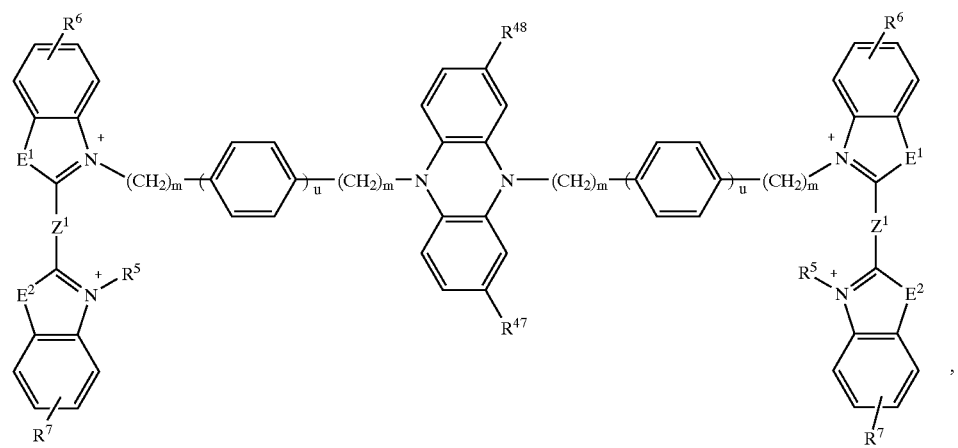
(XXXIV)
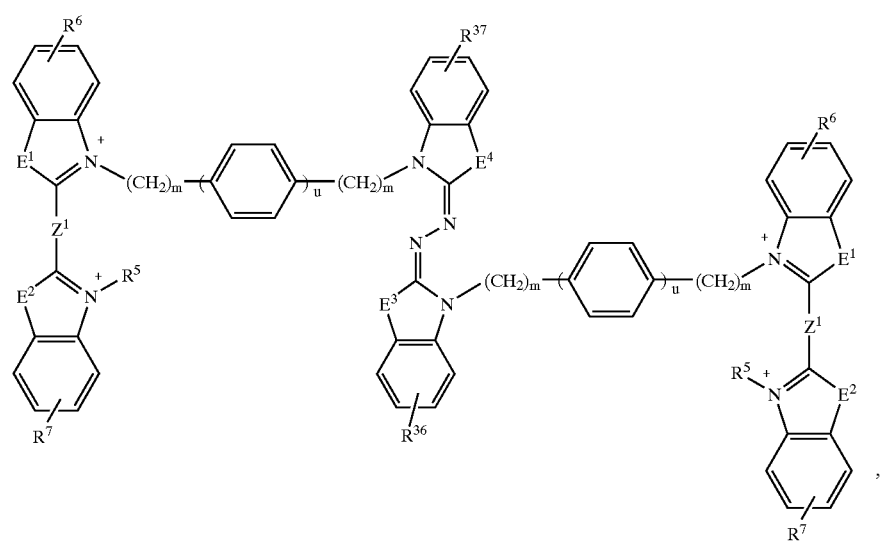

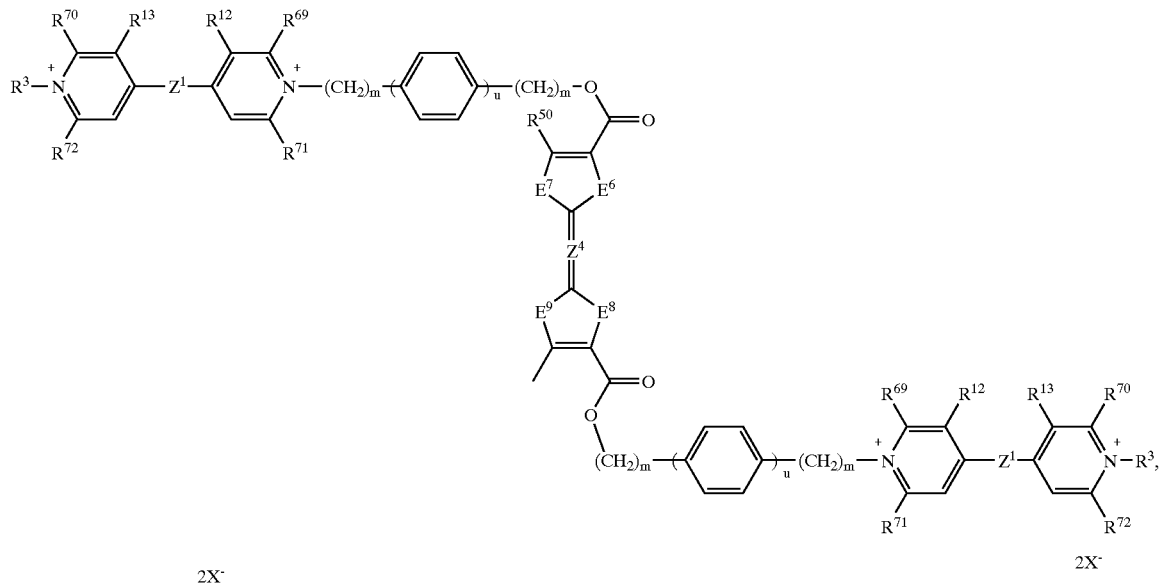
(XXXV)
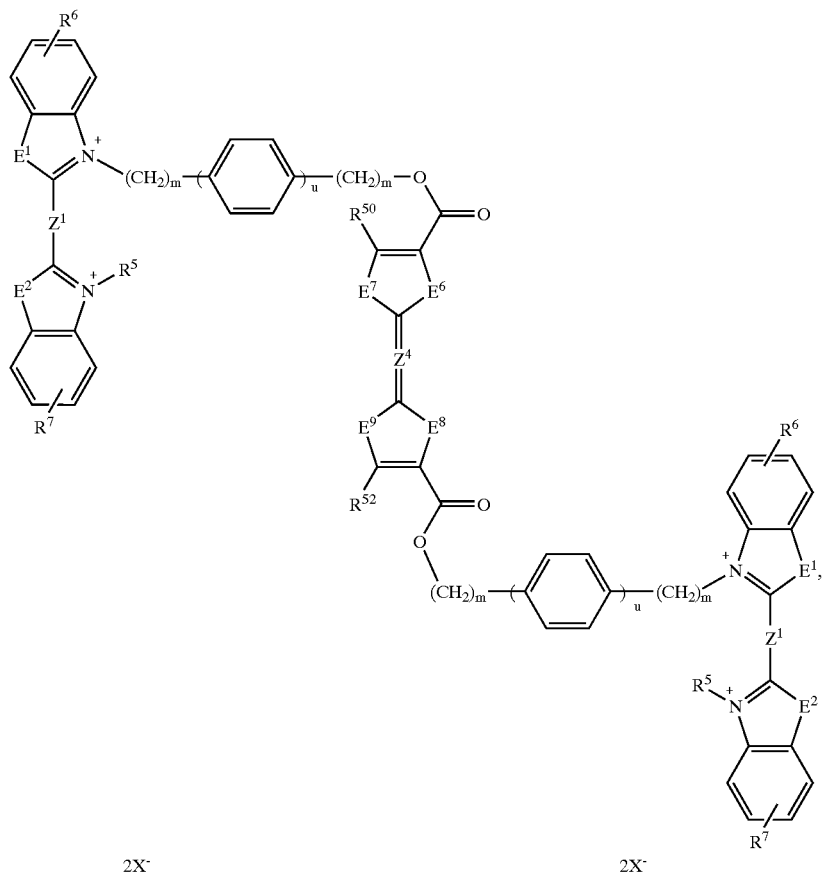
(XXXVI)

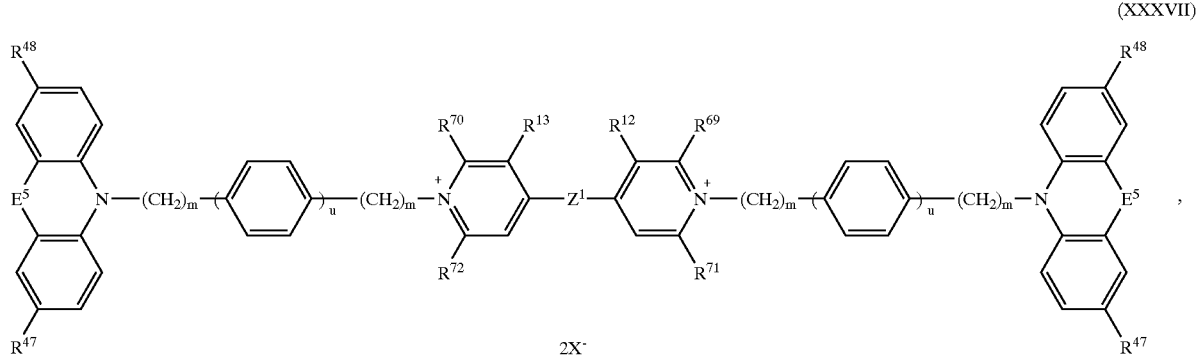
(XXXVII)
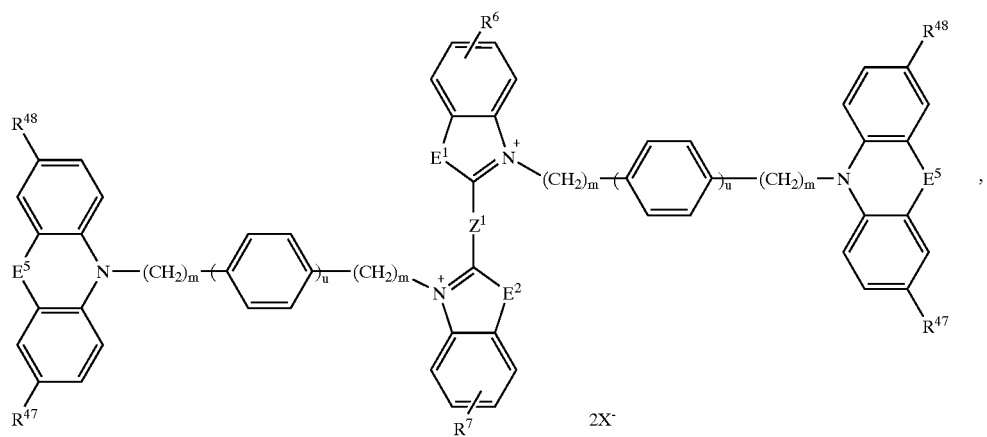
(XXXVIII)
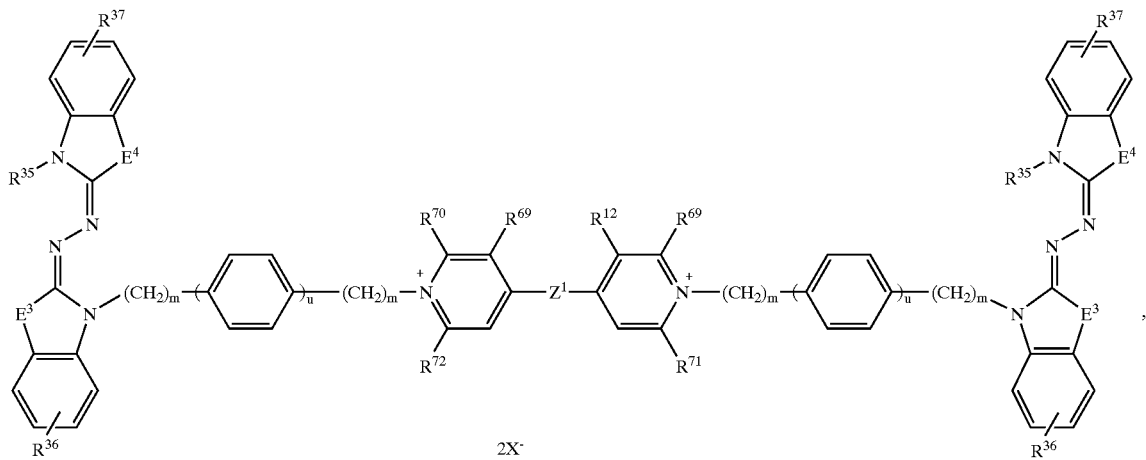
(XXXIX)

-continued
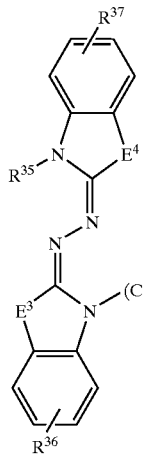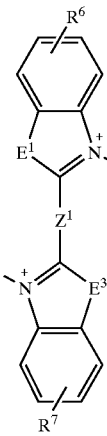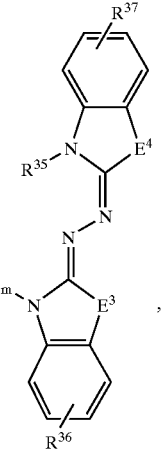
(XL)
2X⁻
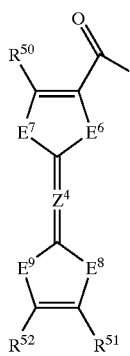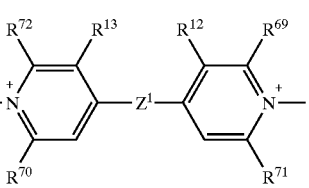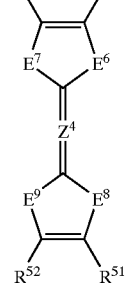
(XLI)
2X⁻
, or
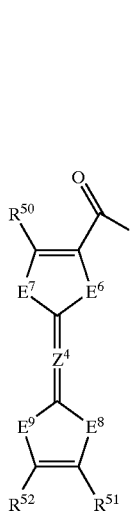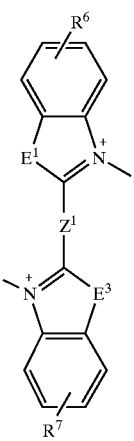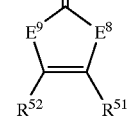
(XLII)
2X⁻
wherein
$R^3$, $R^5$, $R^{35}$ and $R^{39}$ independently of one another represent methyl, ethyl, propyl, butyl, pentyl, hexyl or benzyl,
$R^6$ $R^7$ and $R^{36}$ $R^{37}$ in pairs are identical and represent hydrogen, methyl, methoxy, chloro, cyano or methoxycarbonyl, $R^{12}$ and $R^{13}$ represent hydrogen or, if $Z^1$ denotes a direct bond, together represent a —CH=CH— bridge, $R^{69}$ to $R^{72}$ are identical and represent hydrogen or methyl, $E^1$ and $E^2$ are identical and represent O or S, $Z^1$ represents a direct bond or —CH=CH—, $R^{32}$, $R^{47}$ and $R^{48}$ represent hydrogen, $E^3$, $E^4$, $E^5$ independently of one another represent O, S or $NR^{59}$, with the proviso that $E^3$ and $E^4$ are identical, $R^{29}$, $R^{31}$, and $R^{59}$ independently of one another represent methyl, ethyl, propyl, butyl, pentyl, hexyl or benzyl, $R^{40}$ and $R^{41}$ are identical and represent hydrogen, methyl, ethyl, propyl, butyl or phenyl, $Z^3$ represents a direct bond, —CH=CH— or —N=N—, $R^{50}$ to $R^{52}$ independently of one another represent hydrogen, methyl, methoxy, chloro, cyano, methoxycarbonyl, ethoxycarbonyl or phenyl, $E^6$ to $E^9$ are identical to one another and represent S, Se or $NR^{59}$, $Z^4$ represents a direct double bond, a =CH—CH= or =N—N= bridge, m represents an integer from 1 to 5, u represents 0 or 1 and $X^-$ represents $C_{15}$–$C_{20}$-alkanesulphonate, $C_5$–$C_8$-perfluoroalkane-sulphonate, mono- or dibutylbenzenesulphonate, mono- or di-tert-butylbenzenesulphonate, octylbenzenesulphonate, dodecylbenzenesulphonate, naphthalenesulphonate, biphenylsulphonate, nitrobenzenedisulphonate, naphthalenedisulphonate, dibutylnaphthalenesulphonate, biphenyldisulphonate, benzoylbenzoate, cyanotriphenylborate, tetra-$C_3$- to $C_8$-alkoxyborate, tetraphenoxyborate, 7,8-or 7,9-dicarba-nido-undecaborate(1-) or (2-) or dodecahydrodi-carbadodecaborate(2-), with the proviso that for polyvalent anions $X^-$ represents one equivalent of this anion.

13. An electrochromic device containing an electrochromic fluid according to claim 1.

14. An electrochromic device according to claim 13 configured as a cell, a window pane, a mirror, a sunroof, or a display device.

15. An electrochromic device according to claim 13 comprising two facing transparent glass or plastic plates in which the facing sides carry an electro-conductive coating and between which is contained the electrochromic fluid.

16. An electrochromic device according to claim 15 wherein one of the plates is mirrored.

* * * * *